(12) United States Patent  (10) Patent No.: US 8,788,244 B2
Venkatasubramanian et al.  (45) Date of Patent:  Jul. 22, 2014

(54) SYSTEMS AND METHODS FOR GLOBAL VOLTAGE SECURITY ASSESSMENT IN POWER SYSTEMS

(75) Inventors: Vaithianathan Venkatasubramanian, Pullman, WA (US); Xing Liu, Pullman, WA (US)

(73) Assignee: Washington State University, Pullman, WA (US)

( * ) Notice: Subject to any disclaimer, the term of this patent is extended or adjusted under 35 U.S.C. 154(b) by 599 days.

(21) Appl. No.: 13/113,876

(22) Filed: May 23, 2011

(65) Prior Publication Data

US 2012/0136643 A1  May 31, 2012

Related U.S. Application Data

(60) Provisional application No. 61/347,807, filed on May 24, 2010.

(51) Int. Cl.
  *G06F 7/60*  (2006.01)
  *G06F 17/10*  (2006.01)
(52) U.S. Cl.
  USPC ...................... 703/2; 702/57; 702/60; 702/65
(58) Field of Classification Search
  USPC .................... 703/2; 702/57, 60, 65
  See application file for complete search history.

(56) References Cited

U.S. PATENT DOCUMENTS

| 8,498,832 B2* | 7/2013 | Venkatasubramanian ...... 702/65 |
| 2009/0027067 A1* | 1/2009 | Li et al. ......................... 324/650 |
| 2009/0085407 A1* | 4/2009 | Venkatasubramanian ...... 307/98 |

OTHER PUBLICATIONS

S. Massucco, S. Grillo, A. Pitto, F. Silvestro, "Evaluation of Some Indices for Voltage Stability Assessment" IEEE 978-1-4244-2235; 2009; pp. 1-8.*
Karl Schoder, Amer Hasanovic, Ali Feliachi, "PAT: A Power Analysis Toolbox for MATLAB/Simulink" IEEE Transactions on Power Systems, vol. 18, No. 1 Feb. 2003, pp. 42-47.*
Amjady, N., "Voltage Security Evaluation by a New Framework Based on the Load Domain Margin and Continuation Method", IEEE Power Engineering Society General Meeting, 2005, vol. 3, pp. 2914-2920, Jun. 2005.
Chang, N.C. et al. "Developing a Voltage-Stability-Constrained Security Assessment System, Part I: Determination of Power System Voltage Security Operation Limits", IEEE/PES Transmission and Distribution Conference & Exhibition: Asia and Pacific, pp. 1-5, Aug. 2005.

(Continued)

*Primary Examiner* — Dwin M Craig
(74) *Attorney, Agent, or Firm* — Liang IP, PLLC

(57) ABSTRACT

Systems and methods for global voltage security assessment in power systems are disclosed herein. In one embodiment, a method for assessing voltage security in a power system having a number (i) of buses includes capturing a change in bus voltage and a change in line reactive power for at least some of the buses in the power system, for each of the i number of buses, calculating a voltage assessment index ($\Gamma_i$) for as follows:

$$\Gamma_i = \sum_j \frac{\Delta Q_{ij}}{\Delta V_i}$$

where $\Delta V_i$ is the change in bus voltage and $\Delta Q_{ij}$ is the change in line reactive power from a connection j over a predetermined period of time. The method further includes assessing a current voltage security status of the power system based on the calculated voltage assessment index ($\Gamma_i$).

20 Claims, 24 Drawing Sheets

(56) References Cited

OTHER PUBLICATIONS

Gao, B. et al. "Voltage Stability Evaluation Using Modal Analysis", IEEE Transactions on Power Systems, vol. 7, No. 4, pp. 1529-1542, Nov. 1992.

Huang, G. and T. Zhu, "Voltage Security Assessments Using the Arnoldi Algorithm", IEEE Power Engineering Society Summer Meeting, 1999, vol. 2, pp. 635-640, Jul. 1999.

Hui, K.C. and M.J. Short, "A Neural Networks Approach to Voltage Security Monitoring and Control", Neural Networks to Power Systems, 1991, Proceedings of the First International Forum on Applications of, pp. 89-93, Jul. 1991.

Liu, H. et al., "A Fast Voltage Security Assessment Method Using Adaptive Bounding", IEEE Transactions on Power Systems, vol. 15, No. 3, pp. 325-330, Aug. 2000.

Liu, G. et al., "Oscillation Monitoring System Based on Wide Area Synchrophasors in Power Systems", Bulk Power System Dynamics and Control—VII. Revitalizing Operational Reliability, 2007 iREP Symposium, pp. 1-13, Aug. 2007.

Liu, M. L. et al. "PMU Based Voltage Stability Analysis for Transmission Corridors". Electric Utility Deregulation and Restructuring and Power Technologies, Third International Conference, pp. 1815-1820, Apr. 2008.

Morison, K. et al., "Power System Security Assessment", IEEE Power & Energy Magazine, pp. 30-39, Sep./Oct. 2004.

Pandit, M. et al., "Fast Voltage Contingency Selection Using Fuzzy Parallel Self-Organizing Hierarchical Neural Network", IEEE Transactions on Power Systems, vol. 18, No. 2, pp. 657-664, May 2003.

Parniani, M. et al., "Voltage Stability Analysis of a Multiple-Infeed Load Center Using Phasor Measurement Data", Power Systems Conference and Exposition, 2006, PSCE '06, 2006 IEEE PES, pp. 1299-1305, Oct. 2006.

Patidar, N.P. and J. Sharma, "Case-Based Reasoning Approach to Voltage Security Assessment of Power System", Industrial Technology, 2006, ICIT 2006, IEEE International Conference on, pp. 2768-2772, Dec. 2006.

Schweitzer, III, E.O. and D.E. Whitehead, "Real-World Synchrophasor Solutions", Protective Relay Engineers, 2009, 62nd Annual Conference for, pp. 1-12, Mar. 2009, presented Oct. 2008 at 35th Annual Western Protective Relay Conference.

Yu, Y. et al., "On-line Voltage Security Assessment of the Beijing Power System", Electric Utility Deregulation and Restructuring and Power Technologies, 2008, DRPT 2008, Third International Conference on, pp. 684-688, Apr. 2008.

\* cited by examiner

SYSTEMS AND METHODS FOR GLOBAL VOLTAGE SECURITY ASSESSMENT IN POWER SYSTEMS

CROSS-REFERENCE TO RELATED APPLICATION(S)

This application claims priority to U.S. Provisional Application No. 61/347,807, filed on May 24, 2010, the disclosure of which is incorporated herein by reference in its entirety.

TECHNICAL FIELD

The present disclosure is related to systems and methods for global voltage security assessment in power systems.

BACKGROUND

As power grids become more and more complex, system operation security has become a big concern. Voltage security assessment is a powerful way for measuring system operation security because such assessment can provide information about how certain contingency would affect the whole power system. Base on the assessment, the system operators can evaluate system security and determine feasible control actions.

Several conventional techniques have been developed to perform voltage security assessment in a power system. For example, traditional operational planning studies may be applied with transmission line tripping and load forecast. These studies, however, are time consuming and are only suitable for off-line analysis. In another conventional technique, P-V curves and V-Q curves are used in voltage stability analysis. Information, such as critical limits, operation region, etc, can be readily identified in these curves. In a further example, dynamic and/or static modal analysis may be performed for voltage security assessment. Dynamic analysis is similar to transient stability analysis while static analysis is based on eigenvalue analysis or singular value decomposition of a system power flow Jacobian matrix. A stability degree can be identified by computing the eigenvalues and eigenvectors of the reduced Jacobian matrix. Bus, generator, branch participation factors can also be attained to evaluate the contribution of each component.

On-line voltage security assessment has attracted a great deal of interest lately. Many techniques have been proposed. However, most of these techniques utilize at least some of the foregoing techniques for assessment. Other techniques have also been developed to perform the same function, such as neural network method, fuzzy-logic method, adaptive bounding method, and case-based reasoning approach. However, these techniques are complex and computationally demanding. Accordingly, there is a need for systems and methods for efficiently and cost-effectively assess operation security in a power system.

DETAILED DESCRIPTION

Specific details of several embodiments of the disclosure are described below with reference to systems and methods for global voltage security assessment in power systems. Several embodiments can have configurations, components, or procedures different than those described in this section, and other embodiments may eliminate particular components or procedures. A person of ordinary skill in the relevant art, therefore, will understand that the invention may have other embodiments with additional elements, and/or may have other embodiments without several of the features shown and described below with reference to FIGS. 1-33.

Several embodiments of the technology define and utilize a voltage security assessment index (the "index") for each bus in a power system identified by line sensitivities at individual buses. The index can present a bus status irrespective of the current operation condition or post-contingency of the bus. The comparison between the indices from buses can also indicate problematic regions in the power system. With the problematic regions identified, Q margin for the region or bus can be calculated as the minimum reactive power margin reference for the whole system.

As used hereinafter, line sensitivity generally refers to an incremental amount of transmission line reactive power versus a responding bus voltage in a calculation sense, i.e., $\Delta Q_{ij}/\Delta V_i$. The index ("Γ") can combine at least some or all line sensitivities at a particular bus in a number of suitable ways. In the illustrated embodiment, pure summation is applied though weighted summation and/or other suitable techniques may also be applied in other embodiments. It is believed that the index Γ represents an opposite value of a slope of certain points in a Q-V curve and a degree of stability in the power system.

Other embodiments of the technology is related to a fast computation method based on power flow analysis for deriving the index. In certain embodiments, the computation method is based on only an amount of both line reactive power and bus voltage in a small interval. As a result, the amount of power flow calculation may be reduced compared to conventional techniques. As discussed in more detail below with reference to FIGS. 17-33, line sensitivity may be estimated from synchrophasor measurements in the power system. In other embodiments, line sensitivity may be obtained via other suitable techniques.

Systems for Global Voltage Security Assessment

Figure 1A:
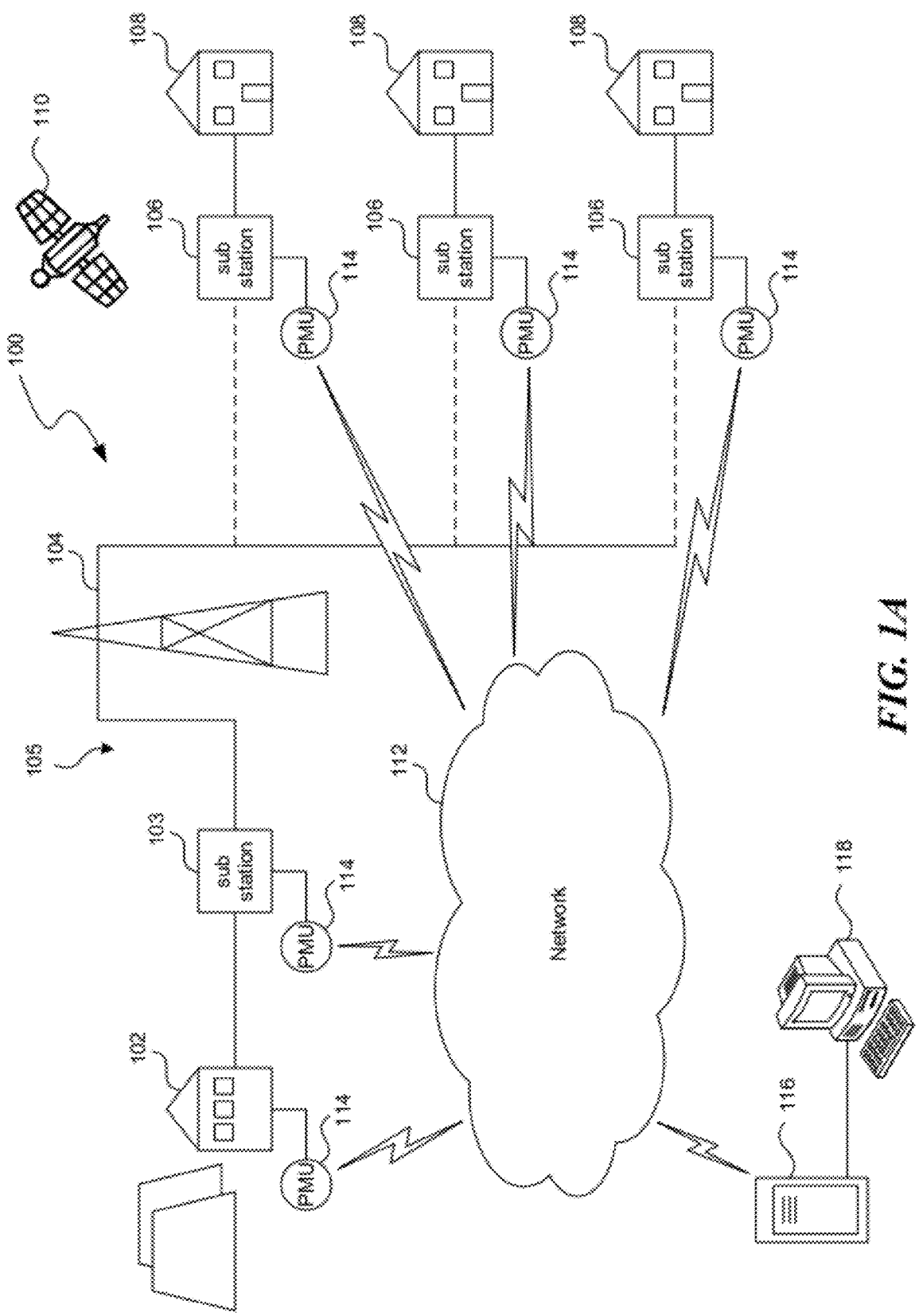
FIG. 1A is a schematic diagram of a power system in accordance with embodiments of the technology.

FIG. 1A is a schematic diagram of a power system 100 in accordance with embodiments of the invention. As shown in FIG. 1, the power system 100 can include a power generating plant 102, a step-up substation 103, a transmission tower 104, a plurality of step-down substations 106, and a plurality of power consuming loads 108 interconnected with one another by a power grid 105. Even though only certain system components (e.g., one power generating plant 102 and one step-up substation 103) are illustrated in FIG. 1, in other embodiments, the power system 100 and/or the power grid 105 can include other system components in addition to or in lieu of those components shown in FIG. 1.

The power system 100 can also include a plurality of phasor measurement units ("PMUs") 114 individually coupled to various components of the power system 100. For example, as illustrated in FIG. 1, the power generating plant 102, the step-up substation 103, and each of the step-down substations 106 include one PMU 114. The PMUs 114 can be configured to measure current conditions (e.g., as represented by voltage, current, and/or other types of phasor measurements) of the transmitted power in the power system 100 based on a common time reference (e.g., a GPS satellite 110).

The power system 100 can also include a power data concentrator ("PDC") 116 operatively coupled to the PMUs 114 via a network 112 (e.g., an internet, an intranet, a wide area network, and/or other suitable types of network). The PDC 116 can include a logic processing device (e.g., a network server, a personal computer, etc.) configured to "align" phasor measurements from the PMUs 114 based on their time stamps with reference to the GPS satellite 110.

In the illustrated embodiment, the power system 100 includes an optional supervisory computer station 118 operatively coupled to the PDC 116. The supervisory computer station 118 can be configured to retrieve phasor measurements from the PDC 116 and analyze the retrieved data in order to monitor and controlling electromechanical oscillation in the power system 100, as described in more detail below. In other embodiments, the PDC 116 can analyze the phasor measurements received from the PMUs 114 and provide the analysis results to the supervisory computer station 118. In further embodiments, the power system 100 can include an analysis processor (not shown) operatively coupled to the PDC 116 and the supervisory computer station 118 to analyze the phasor measurements collected by the PMUs 114.

Theoretical Background

Without being bound by theory, the following description is believed to provide a theoretical background for a better understanding of various aspects of the systems and methods for global voltage security assessment in power systems. The applicants do not attest to the scientific truthfulness of the following description.

Figure 1B:
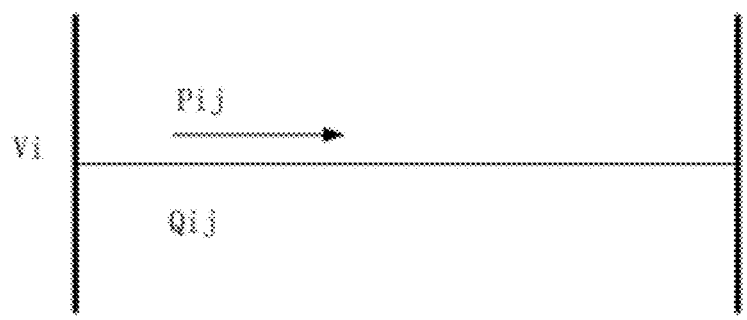
FIG. 1B is a schematic diagram illustrating a connection in a power system in accordance with embodiments of the technology.
Figure 2:
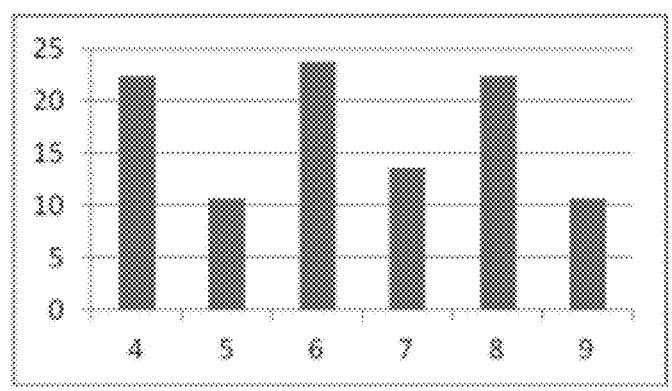
FIG. 2 is a graph of global voltage security assessment index versus power bus illustrating a case study in a 9-bus power system in accordance with embodiments of the technology.
Figure 3:
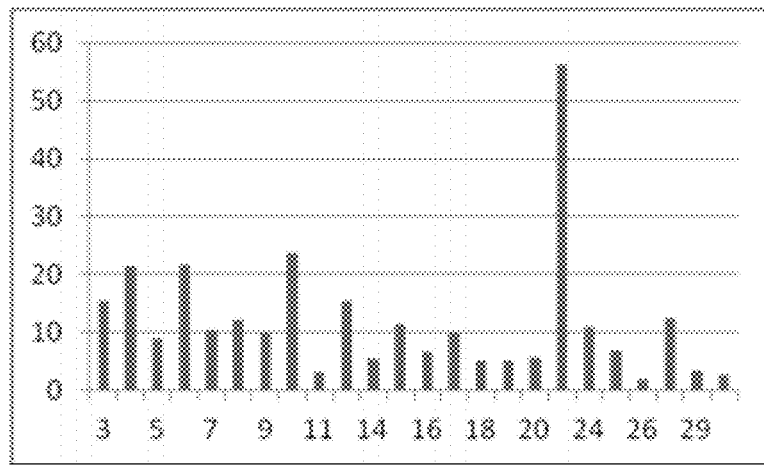
FIG. 3 is a graph of global voltage security assessment index versus power bus illustrating a case study in a 30-bus power system in accordance with embodiments of the technology.
Figure 4:
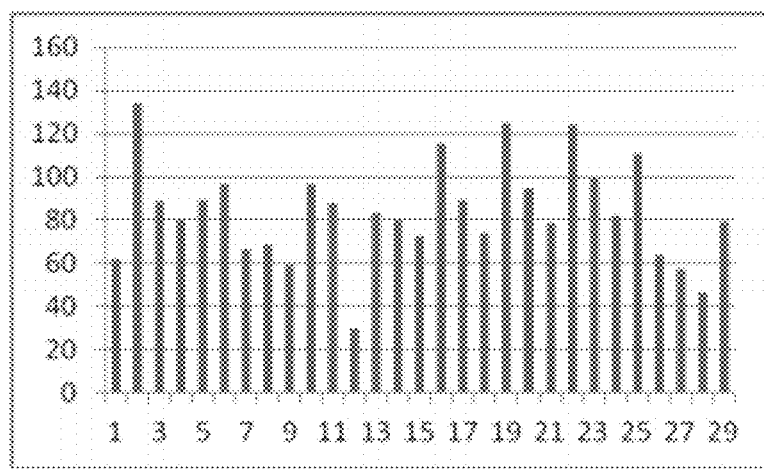
FIG. 4 is a graph of global voltage security assessment index versus power bus illustrating a case study in a 39-bus power system in accordance with embodiments of the technology.

FIG. 1B shows a transmission or equivalent line (e.g., a transformer) and its one ending bus i. The basic active and reactive power line flow equations are believed to be following:

$$P_{ij}=V_i^2(G_{ij}+G_{i0})-V_iV_j(G_{ij}\cos\delta_{ij}+B_{ij}\sin\delta_{ij}) \quad (1)$$

$$Q_{ij}=-V_i^2(B_{ij}+B_{i0})-V_iV_j(G_{ij}\sin\delta_{ij}-B_{ij}\cos\delta_{ij}) \quad (2)$$

where line admittance is $Y_{ij}=G_{ij}+jB_{ij}$, shunt admittance is $Y_{i0}=G_{i0}+jB_{i0}$, and $\delta_{ij}=\delta_i-\delta_j$ is the difference between two bus voltage angles. It is believed that the change of bus voltage magnitude is more related to the change of line reactive power than other factors. Thus, using Taylor's equation, (3) can be attained:

$$\Delta Q_{ij} = \Delta Q_{ij}(\Delta V_i, \Delta V_j) = \frac{\partial Q_{ij}}{\partial V_i}\Delta V_i + \frac{\partial Q_{ij}}{\partial V_j}\Delta V_j + O(V_i, V_j) \quad (3)$$

In several embodiments, the detailed expression of (3) is not extended, though it is also a way to calculate $\Delta Q_{ij}/\Delta V_i$, a different and more direct method is used. As shown in (3), $\Delta Q_{ij}/\Delta V_i$ is pointed to line sensitivity rather than $\partial Q_{ij}/\partial V_i$ for bus i. Thus, $\Delta Q_{ij}/\Delta V_i$ is not equal to $\partial Q_{ij}/\partial V_i$. In a small region, linearization assumption can be true, and so $\Delta Q_{ij}/\Delta V_i$ can represent the total differential $dQ_{ij}/dV_i$. In contrast, $\partial Q_{ij}/$ $\partial V_i$ is a term of the whole equation. In a power system, it is believed that a meaningful bus voltage is around 1 p.u., the attribute of the transmission line is dominant in calculating $\partial Q_{ij}/\partial V_i$, not the current bus voltages.

In several embodiments, the method includes obtaining both bus voltage and line reactive power simultaneously in a small region. This approach has at least two advantages. First, calculation is simple because it is unnecessary to plot the whole curve. Instead, a current snapshot of the whole graph is captured. Secondly, the effects from other factors besides bus voltage at bus i are also considered. When two endings of a line are PQ buses, $V_i$'s changing is believed to lead to the change of $V_j$. Under certain conditions (e.g., P injection changes), it can result in the change of bus angle.

In a small suitable region, the change of the load at bus i can provide an adequate estimation of $\Delta Q_{ij}$ and $\Delta V_i$. One base case is needed for power flow analysis. Load changing can be simulated by inserting a reasonable amount of shunt capacitor/reactor at bus i and then solving power flow. It is believed that all line sensitivities at a bus need to run power flow analysis only once.

Global Security Index

In several embodiments, a global voltage security assessment index for bus i is defined as below:

$$\Gamma_i = \sum_j \frac{\Delta Q_{ij}}{\Delta V_i} \quad (4)$$

where, $\Delta Q_{ij}$ represents line reactive power change for each transmission line (or transformer in equivalent line mode) connected with bus i. If bus i is a load bus with one injection line, $\Gamma_i$ identifies the slope at a Q-V curve around the current operation point. The entire Q-V curve does not need to be plotted. Generally, the Q-V curve may be shifted up or down. The value of $\Gamma_i$ corresponds to the current status of the bus because the closer to the bottom the operation point is, the closer to "0" the slope is in the Q-V curve. The index $\Gamma_i$ can be used to assess bus voltage security based on its numeric values. For example, the smaller values can indicate the weaker buses. If there is $\Gamma_i(s)$ with near "0" value(s), the power system may be close to some critical limits such as no Q margin, or close to collapse.

Case Study

As discussed below, an IEEE 9-bus system, an IEEE 30-bus system, a New England 39-bus system, and an IEEE 300-bus system were used as test systems. The base case of each system came from Matpower Package used to solve the power flow. First, the estimated $\Gamma_i$ of each bus for each system was calculated. Then comparing Q margin at bus i and $\Gamma_i$ showed that the smallest $\Gamma_i$ value corresponds to the least Q margin. For contingency analysis, line tripping was used to calculate the index $\Gamma_i$. For system collapse analysis, IEEE 300-bus system was used.

A. Voltage Security Index of Base Case

10 MVar shunt capacitor was switched at each bus in the base case for all test systems except IEEE 300-bus system, which used a 1 Mvar shunt capacitor. Note that all buses were load buses, i.e., PQ buses. As shown in FIGS. 2-7, the weakest bus in each system was:

9-bus system: Bus 9
30-bus system: Bus 26
39-bus system: Bus 12
300-bus system: Bus 9042

Thus, according to the discussion above, the foregoing buses are expected to have the least load capacity if current typology is constant. In particular, the 300-bus system is so stressed that the system is close to collapse. The results of the tests are discussed below.

B. The Comparison Between Index and Q Margin

Suppose the active power is constant, a reactive load was increased gradually at each bus until the power flow solution fails. The index and Q margin were plotted in FIGS. 8-13. The y-axis is the percentage of index and Q margin to the maximum index and maximum Q margin, respectively. As the following results show the bus with the smallest index has the smallest Q margin.

9-Bus System: Table I and FIG. 8

TABLE I

|  | Minimum | Maximum |
|---|---|---|
| Index | Bus 9 10.639 | Bus 6 23.753 |
| Q margin | Bus 9 240 | Bus 6 370 |

30-Bus System: Table II and FIG. 9

TABLE II

|  | Minimum | Maximum |
|---|---|---|
| Index | Bus 26 1.952 | Bus 21 56.399 |
| Q margin | Bus 26 35 | Bus 4 240 |

39-Bus System: Table III and FIG. 10

TABLE III

|  | Minimum | Maximum |
|---|---|---|
| Index | Bus 12 30.208 | Bus 2 134.37 |
| Q margin | Bus 12 725 | Bus 2 3495 |

300-Bus System: Table IV and FIG. 11 to FIG. 13

TABLE IV

|  | Minimum | Maximum |
|---|---|---|
| Index | Bus 9042 0.1573 | Bus 235 1701.21 |
| Q margin | Bus 9042 2 | Bus 237 2040 |

C. Examples on Line Tripping and Load Increasing

It is believed that the voltage security of the entire power system is indicated by the minimum index. For example, the minimum index is 0.1573 in the 300-bus system, indicating that the system is so stressed and is close to collapse. The 30-bus system has a similar issue. On the other hand, the 39-bus system appears to be stable. It is also believed that if the weakest bus changes, the whole system security changes accordingly, as illustrated in the 39-bus system. During testing, a first contingency was a line trip between bus 15 and bus 16. A second contingency was a line trip between bus 28 and bus 29. The results are shown in FIG. 14.

Figure 14:
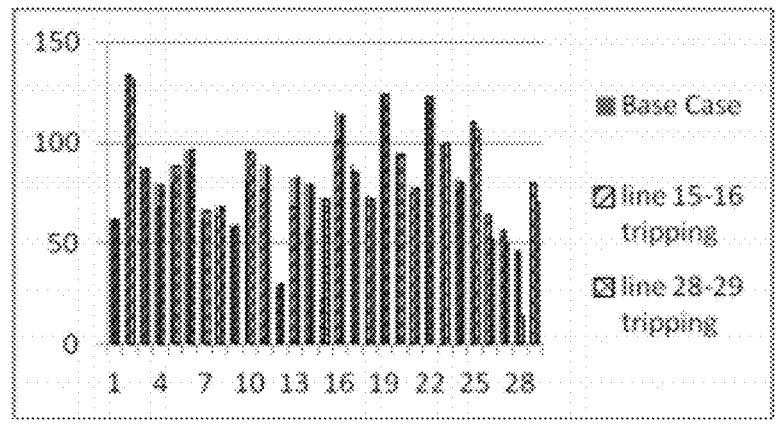
FIG. 14 is a graph of global voltage security assessment index versus power bus illustrating a comparison of several case studies in accordance with embodiments of the technology.

As shown in FIG. 14, the line trip between 15 and 16 makes bus 15 the weakest bus while the line trip between 28 and 29 makes bus 28 the weakest bus. The reason is obvious. For bus 15 and bus 28, one of two major feeding lines were cut so that the system naturally becomes weaker. On the other hand, the minimum Q-margin is 455 MVar at bus 15 after first contingency and 345 MVar at bus 28 after second contingency.

It was also found that as load increases, the index becomes smaller. When the load is rising, the system status becomes worse. Therefore, the system loses voltage security. If this situation happens at one bus, the index of that bus becomes smaller. If this situation happens at a region or whole system, the indices in that region also become smaller. The foregoing results were verified using the 30-bus system.

Figure 15:
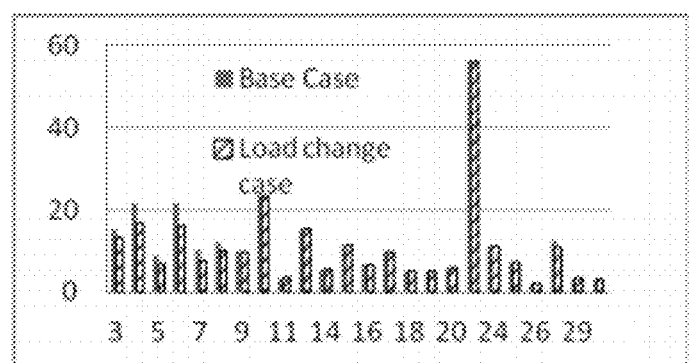
FIG. 15 is a graph of global voltage security assessment index versus power bus illustrating a case study of one bus in a 30-bus power system before and after a load increase in accordance with embodiments of the technology.

The original load amount was not big even in the base case. The load at bus 7 was increased by 300%, that is, $P_L$=22.8→91.2 MW and $Q_L$=10.9→43.6 MVar. The comparison is shown in FIG. 15. It can be seen that buses (bus 3, 4, 5, 6 and 8) proximate bus 7 are more severely impacted than those farther way from bus 7. But as a whole, the indices decline.

Figure 16:
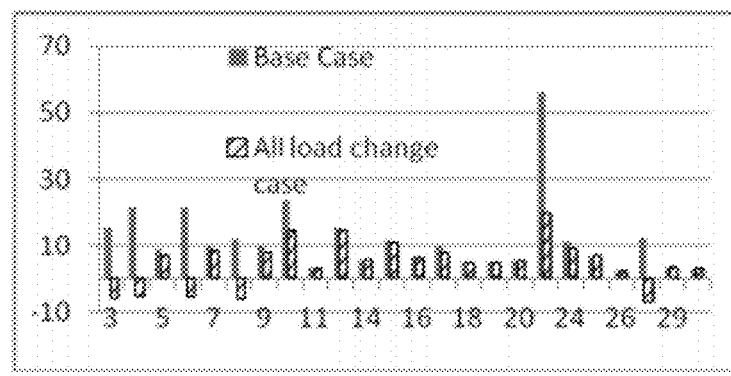
FIG. 16 is a graph of global voltage security assessment index versus power bus illustrating a case study of all buses in a 30-bus power system before and after a load increase in accordance with embodiments of the technology.

The 30-bus system was also used as a stressed test system. The minimum index was 1.9522 at bus 26. Although the total real and reactive power in the base case were only 189.2 MW and 107.2 MVar, only 50% increase at all buses can drive the system close to collapse, as shown in FIG. 16. In this scenario, negative index values indicate that the system is near collapsing. More reactive power compensation can make bus voltage decline even more. Instead, the bus needs more power injection because of the increased load.

As discussed above, the global index can be used to assess system voltage security. This index of a bus accounts for all line sensitivities connected at that bus. Theoretically, the line sensitivity is the total differential of line reactive power versus the corresponding bus voltage. In a small region, $\Delta Q_{ij}/\Delta V_i$ can be used to replace the total differential without unacceptable error. Because power transfer occurs through transmission lines and such an index represents all information from line sensitivities, the index also represents a bus capacity, which can indicate the current status of that bus. By checking the minimum index in a power system at a operation condition, the weakest bus can be found, and the level of system voltage security can be determined. This index can also be used to measure the impact from a contingency or load change to the power system.

Several embodiments of a fast computation method to attain line sensitivity based on power flow are also discussed. In several embodiments, the method simulates the load change at a bus by inserting a predetermined amount of a shunt device to capture V and Q changes, which is simple and efficient.

Estimation of Line Sensitivity Using PMU

As the growing demand of loads, the power transfers have been increasing steadily. The power system can be operated in many different operating points in that the power transfers have become more unpredictable because there are so many factors affecting the operating status, e.g., power market deregulation, unscheduled voltage regulation and transmission line tripping. Many factors can push transmission systems to operate close to the limits, which heavily influence the voltage security. As discussed above, a global voltage security index can be defined and used to determine a system status. To calculate that index, line sensitivity is needed. It is believed that the relationship between changes of line reactive power and bus voltage can provide the information representing system capacity, as discussed above.

The following description introduces two methodologies to estimate line sensitivity directly from PMU data instead of using power flow analysis. Power flow analysis is based on supervisory control and data acquisition ("SCADA") and state estimation ("SE") models. If topology errors exist, the result from such a model-based calculation may not be reliable. Also, compared to PMU, power flow analysis is relatively slow. So far, most of PMU systems can give 30 data points per second. Each data point includes a bus voltage, a phase angle, a line current, and a current phase angle, from which changes of bus voltage and line reactive power may be obtained for each point. Therefore, by processing the data, line sensitivity may be calculated efficiently and accurately.

Figure 21:
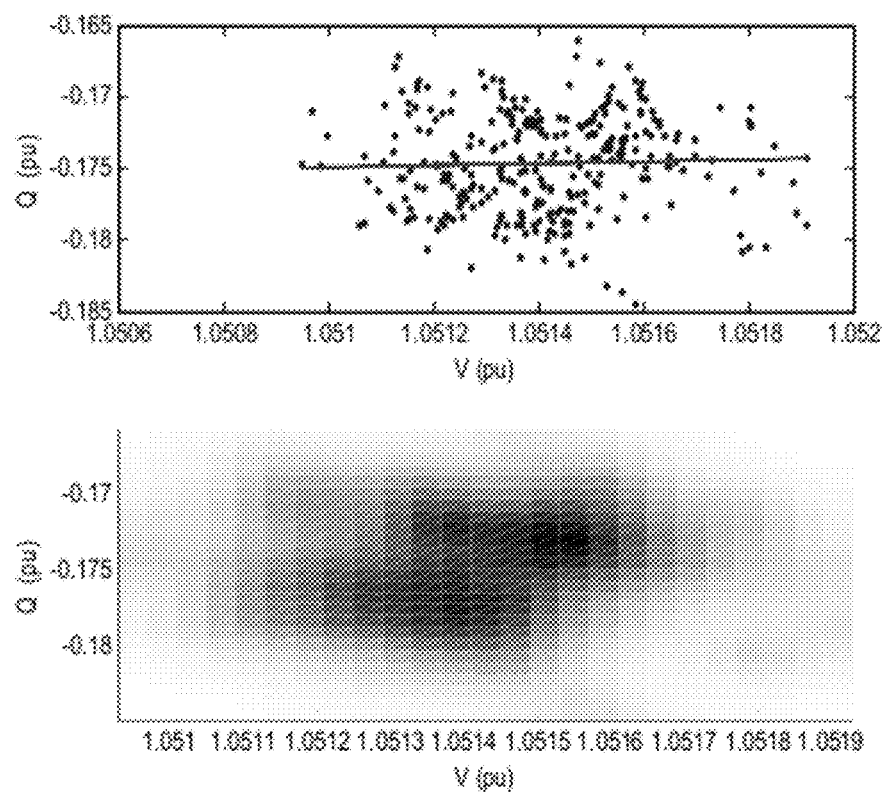
FIG. 21 is a V-Q density plot in a sample power system in accordance with embodiments of the technology.

As shown in FIG. 21, a plot of bus voltage versus line reactive flow from PMU data shows that the trend is not always constant. That is, there exist bi-direction sensitivities. It is believed that the relationship between bus voltage and line reactive power is so complicated that the less injection from some transmission line at one bus does not always cause the bus voltage to decline. In other words, the slope of bus voltage versus line reactive power can be either positive or negative.

In several embodiments, the process of fast bi-direction sensitivity calculation ("FBSC") can be used to directly capture the changes of line reactive power and bus voltage of pairs of points for some time period and then determine the slope (sensitivity) by applying data split and weighted-average-slope. In other embodiments, best linear approximation ("BLA") may be used to approximate the slopes with a linearization equation.

During operation of a power system, one bus may experience a big change during an event, for example, a shunt capacitor is switched on. Such an event can reveal a slope (sensitivity) just like power flow analysis. Extracting such changes from data is much easier than Data Split. The term "Jump" generally refers to a big change in a power system. Several embodiments of the method computes the slope by Jump, and the result combines dynamic and static behaviors of a system.

Figure 17:
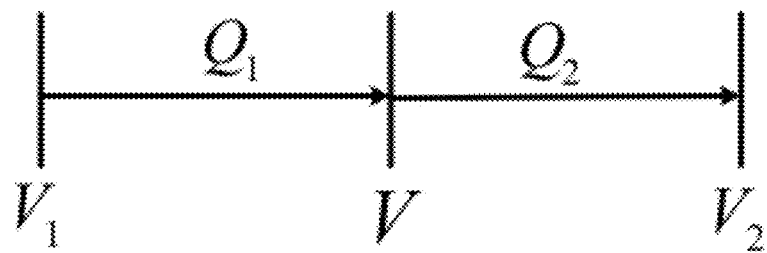
FIG. 17 is a schematic diagram illustrating a model of a power system in accordance with embodiments of the technology.

FIG. 17 is a schematic diagram illustrating a model of a power system in accordance with embodiments of the technology. As shown in FIG. 17, in a real system, a bus can be simplified by integrating line reactive power injections and outgoings. Here $Q_1$ and $Q_2$ are the line reactive powers seen from bus with voltage V. Assumption 1: The change of V can lead to the change of $V_1$ or $V_2$. On the other hand, the change of $V_1$ or $V_2$ can lead to the change of V as well. Assumption 2: irrespective of whether V increases decreases, $Q_1$ or $Q_2$ can increase or decrease, and vice versa. That is, $\Delta V>0$ does not necessarily mean $\Delta Q_i>0$ (i=1, 2). Similarly, $\Delta Q_i>0$ (i=1, 2) does not necessarily mean $\Delta V>0$. For example, if $V_1$ increases, then $V(V_2)$ also increases and $|\Delta V_1|>|\Delta V|>|\Delta V_2|$. Consequently, $Q_1$ and $Q_2$ increase such as $\Delta Q_1<0$, $\Delta Q_2>0$ and $|\Delta Q_1|=|\Delta Q_2|$. If $V_2$ increases, then $V(V_2)$ increases and $|\Delta V_2|>|\Delta V|>|\Delta V_1|$. Consequently, $Q_1$ and $Q_2$ decrease such as $\Delta Q_1>0$, $\Delta Q_2<0$ and $|\Delta Q_1|=|\Delta Q_2|$.

Based on the two assumptions above, there are four basic fluctuation scenarios happening and observed in a real system.
 1) $Q_1$ and V change in the same directions.
 2) $Q_1$ and V change in the opposite directions.
 3) $Q_2$ and V change in the same directions.
 4) $Q_2$ and V change in the opposite directions.

Figure 18:
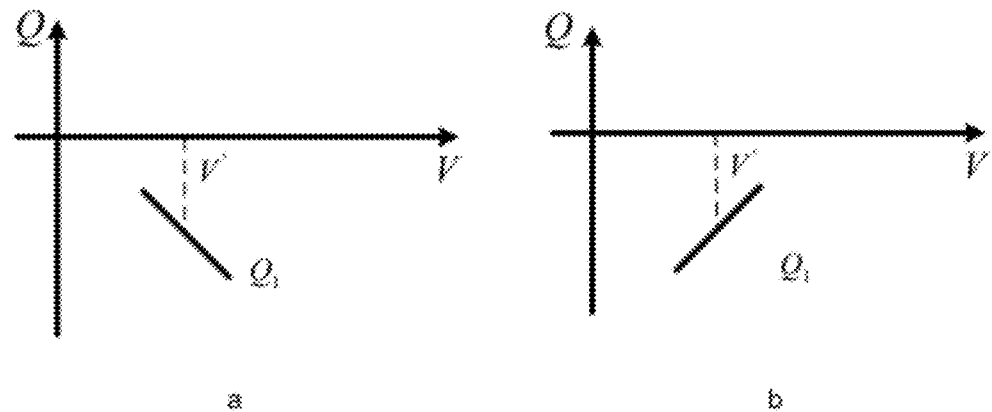
FIG. 18 illustrates V-Q curves for injection power in a small interval in a power system in accordance with embodiments of the technology.
Figure 19:
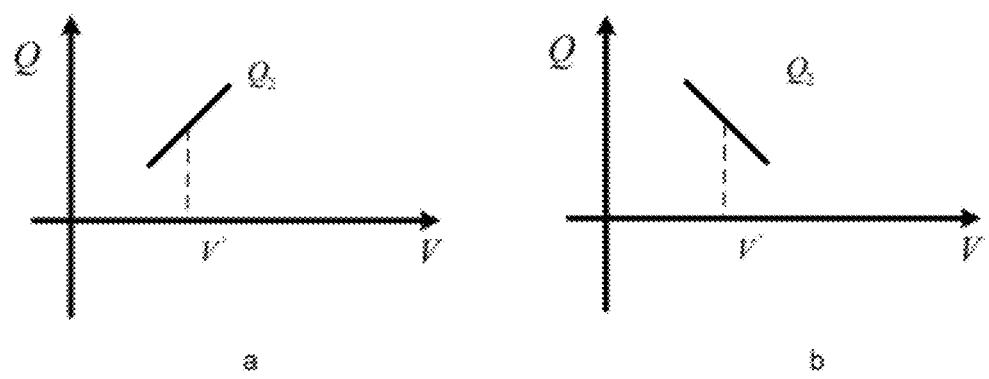
FIG. 19 illustrates V-Q curves for outgoing power in a small interval in a power system in accordance with embodiments of the technology.
Figure 20:
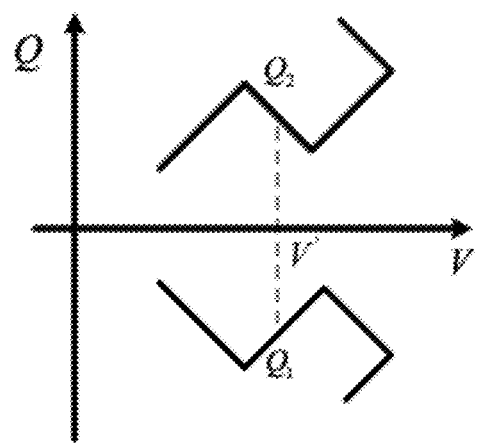
FIG. 20 illustrates V-Q fluctuation in a power system in accordance with embodiments of the technology.

The combination of FIGS. 18 and 19 form the fluctuation which is commonly expressed in PMU data. The FIG. 20 represents just one example combination among a large number of possible combinations.

Analysis of PMU Data

A. Filter

In several embodiments, an optional filter may be used to remove bad data points and some period during which there is no measurement data. The thresholds of the filter can include values for voltage magnitude and current magnitude.

B. Data Split

Figure 5:
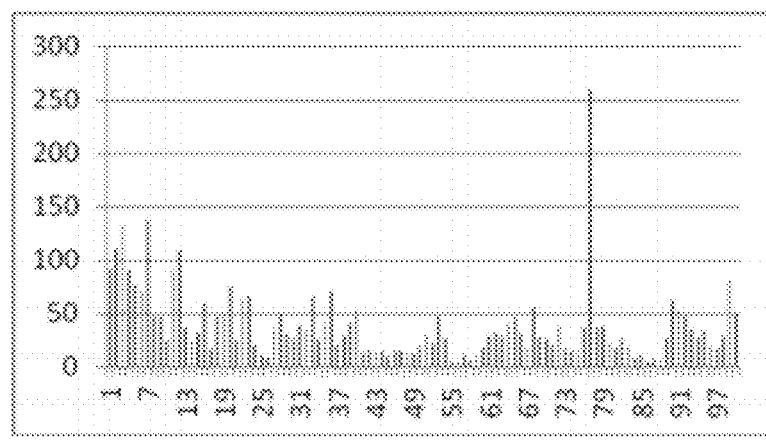
FIGS. 5-7 are graphs of global voltage security assessment index versus power bus illustrating a case study in a 300-bus power system in accordance with embodiments of the technology.
Figure 6:
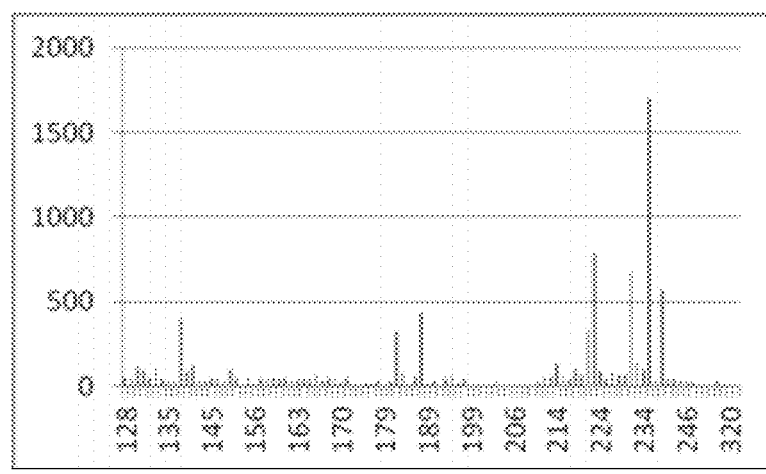
Figure 7:
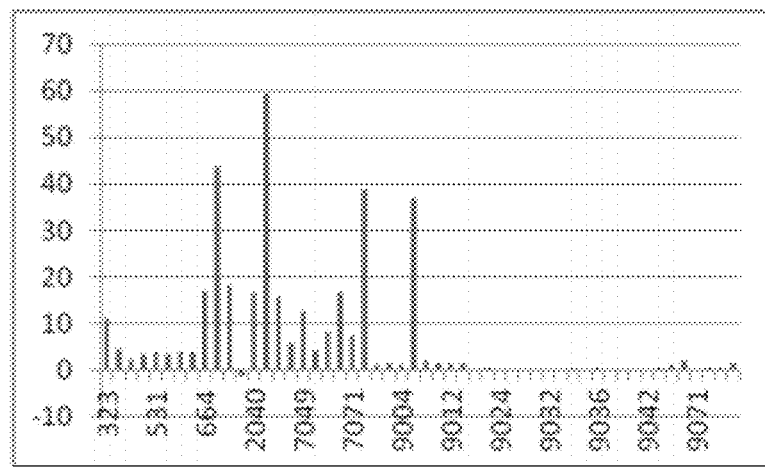
Figure 8:
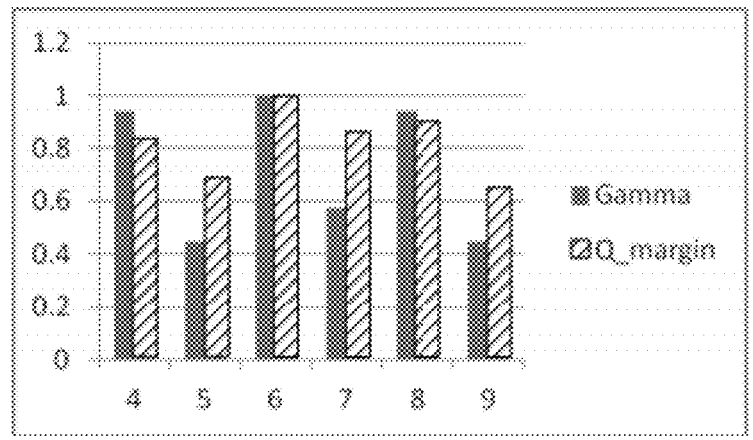
FIG. 8 is a graph of global voltage security assessment index and Q-margin versus power bus illustrating a case study in a 9-bus power system in accordance with embodiments of the technology.
Figure 9:
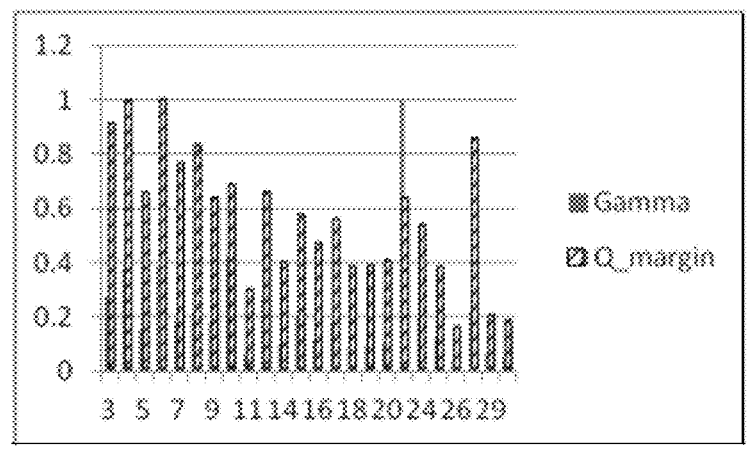
FIG. 9 is a graph of global voltage security assessment index and Q-margin versus power bus illustrating a case study in a 30-bus power system in accordance with embodiments of the technology.
Figure 10:
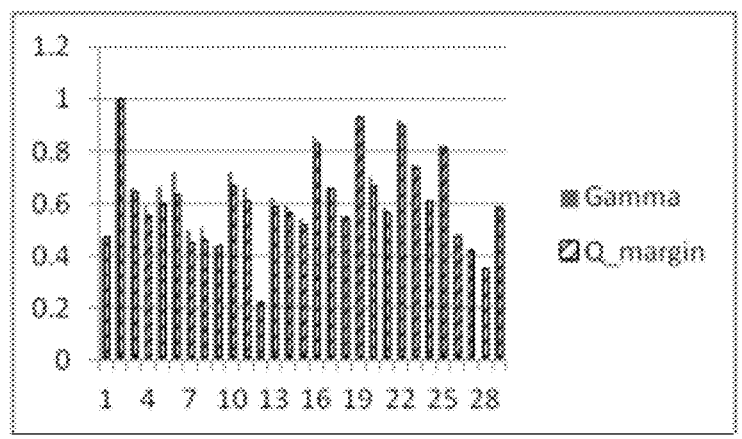
FIG. 10 is a graph of global voltage security assessment index and Q-margin versus power bus illustrating a case study in a 39-bus power system in accordance with embodiments of the technology.
Figure 11:
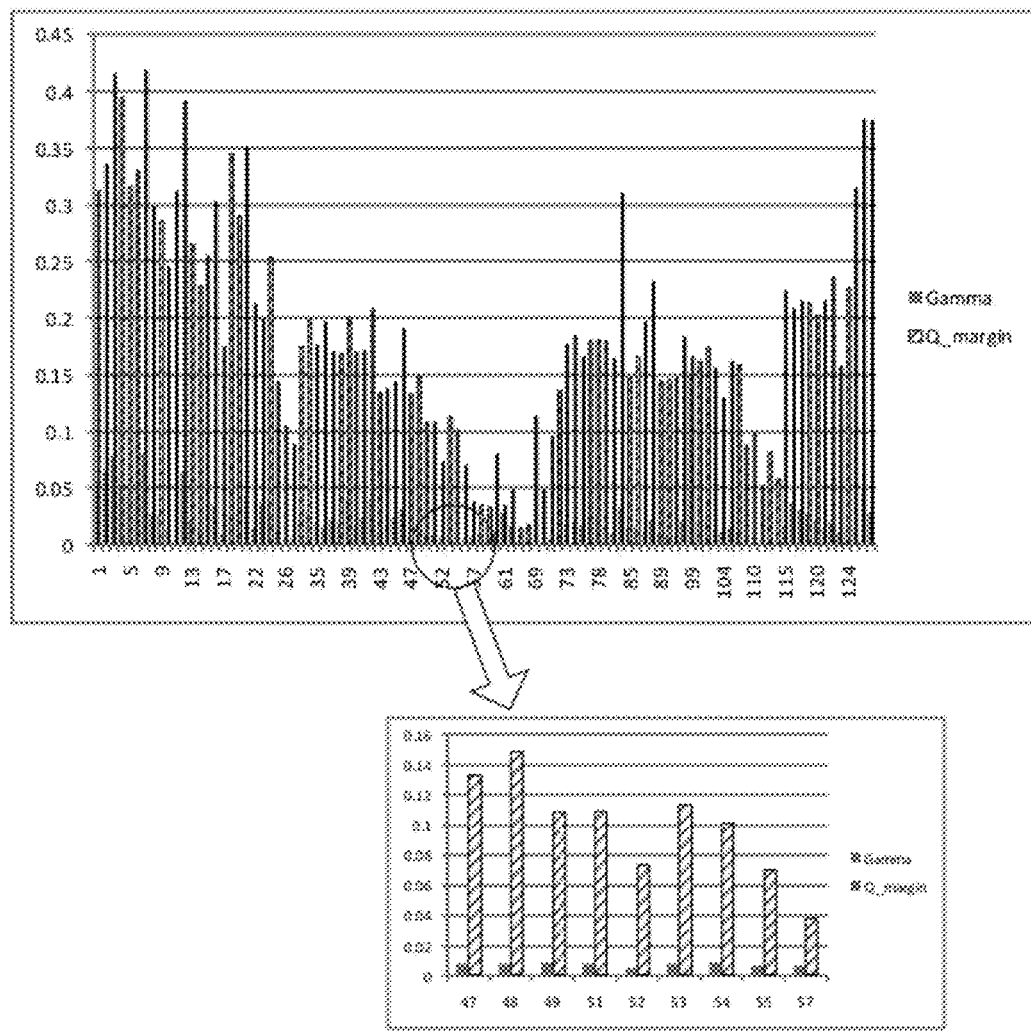
FIGS. 11-13 are graphs of global voltage security assessment index and Q-margin versus power bus illustrating a case study in a 300-bus power system in accordance with embodiments of the technology.
Figure 12:
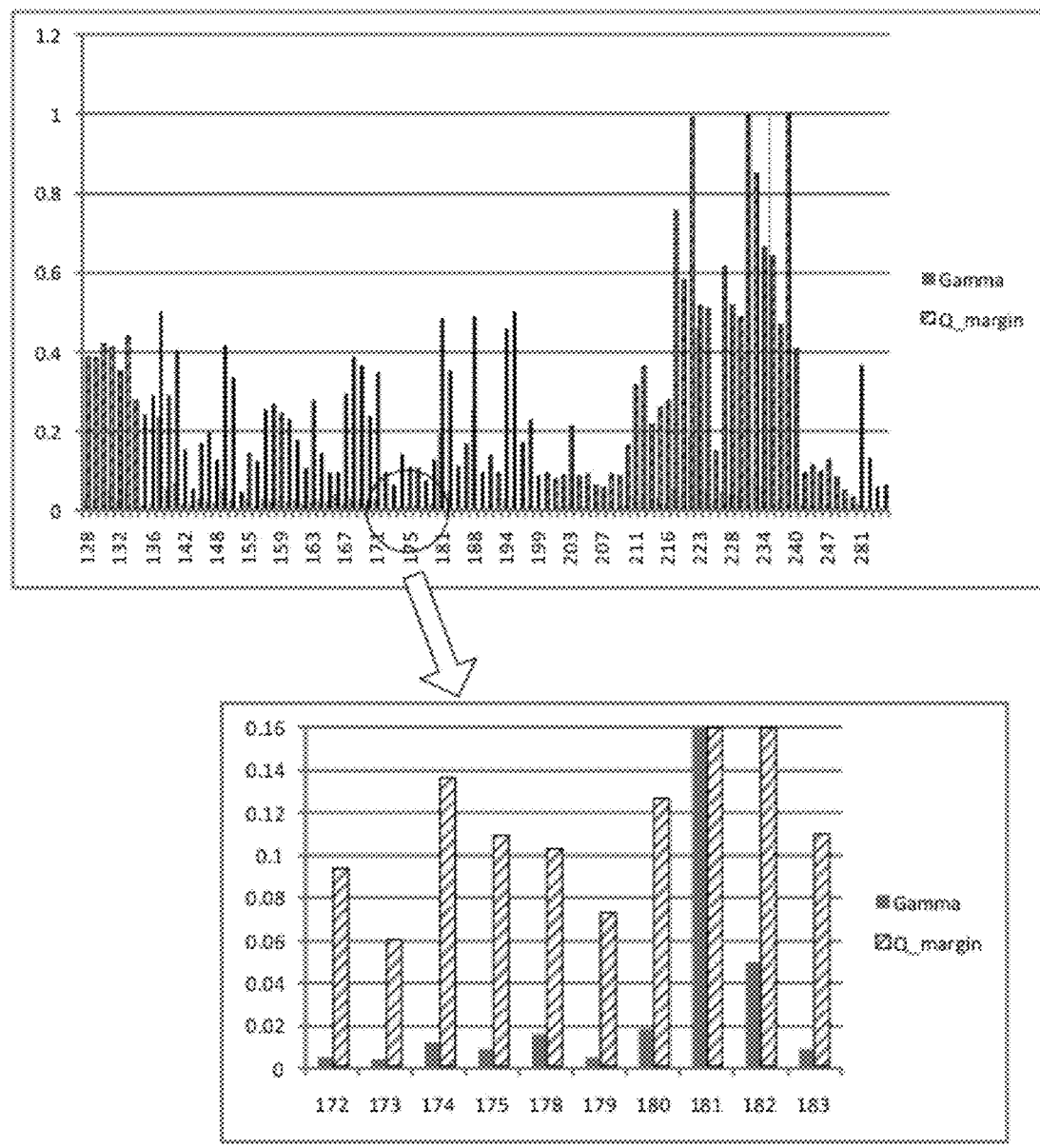
Figure 13:
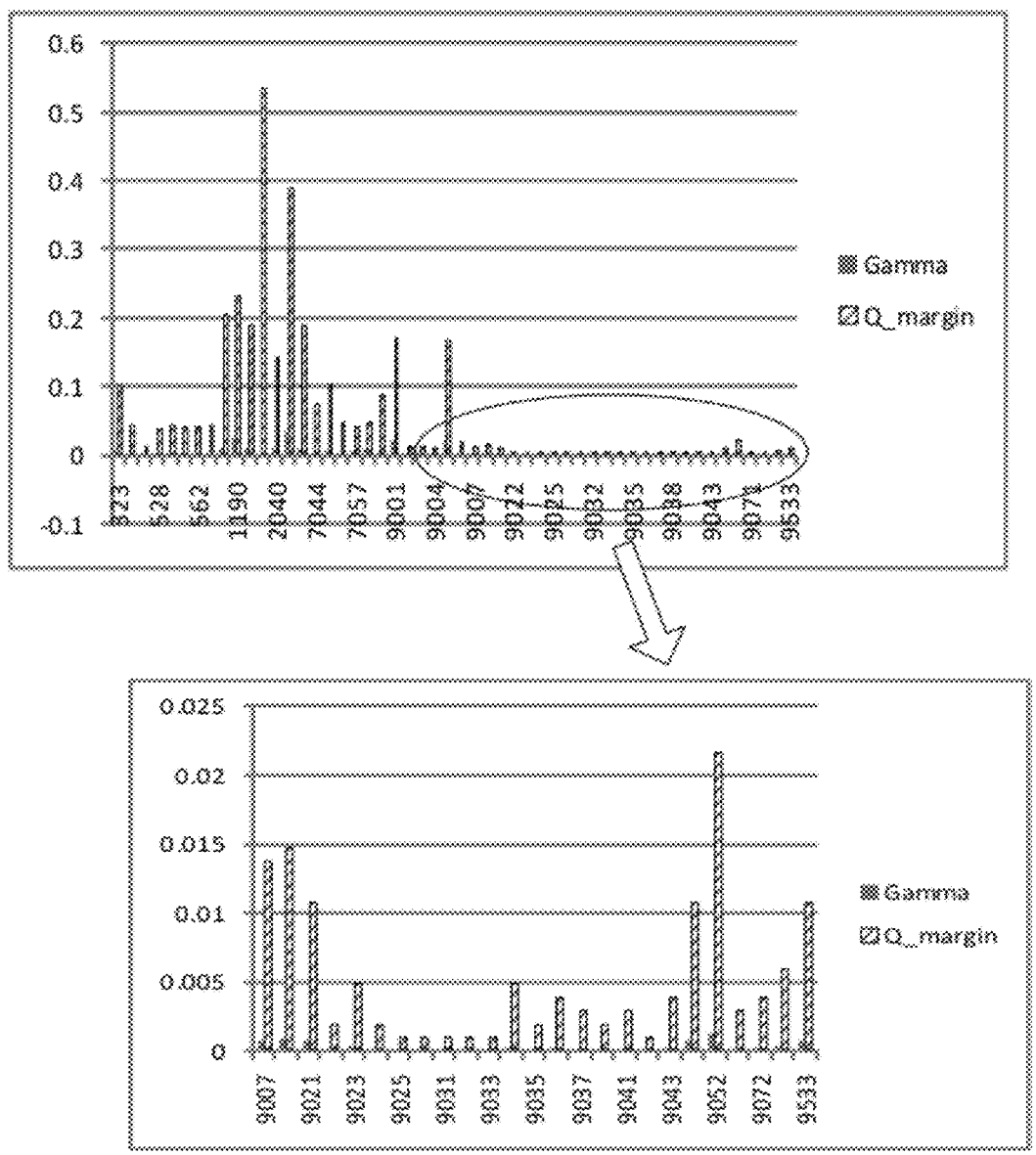

Data split is a way to convert the curves of FIG. 20 into two sets with pure positive or negative slopes as shown in FIGS. 18 and 19. FIG. 5 shows example PMU data in Eastern System in United States collected over a 10 second period.

Figure 22:
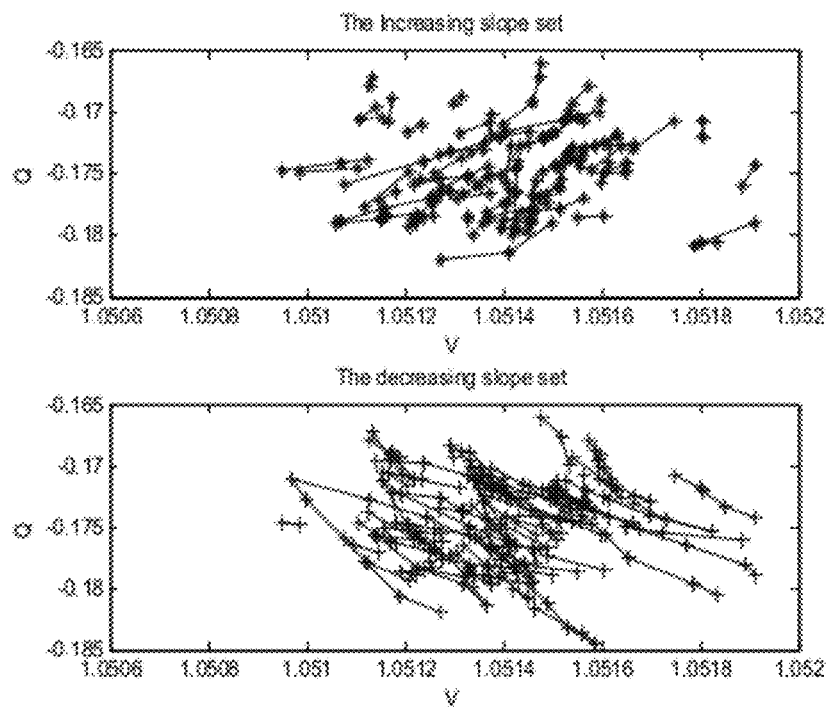
FIG. 22 is a V-Q density plot in a sample power system showing points of V-Q with increasing and decreasing slopes in accordance with embodiments of the technology.

The graph of V vs. Q appears disordered and the linear fit method like least square cannot readily determine a slope. The sign of slope change of V vs. Q is always changing in the real PMU data. Data split is used to separate the data points into two subsets: one with increasing slopes (positive sensitivity) and the other with decreasing slopes (negative sensitivity). After data split, the two subsets are shown in FIG. 22.

C. Weighted-Average-Slope

In one embodiment, slope thresholds are introduced: $V_{err}$ and $Q_{err}$. When FBSC or BLA is applied for the calculation, only the slope with $\Delta V_i > V_{err}$ or $\Delta Q_{ij} > Q_{err}$ or both are taken into account for a slope between two consecutive points. Here i and j are used to represent two terminals of one transmission line for convenience. PMU is installed in terminal i. $Q_{ij}$ is the reactive power injection seen from terminal i. FBSC can utilize $V_{err}$ and $Q_{err}$ simultaneously while BLA only uses $V_{err}$ since no reactive flow occurs explicitly. For illustration purposes, only $V_{err}$ is tuned because it is believed that the slope is much more sensitive to change of bus voltage than to line reactive power flow.

It was discovered that a slightly different value can result in very different results. Table V shows the statistic estimation on distinct PMU data within 10 seconds.

TABLE I

| PMU | $V_i$ (pu) | | $Q_{ij}$ (pu) | |
|---|---|---|---|---|
| Data | σ | μ | σ | μ |
| 1 | 2.3023e−4 | 1.0517 | 0.006 | −0.1749 |
| 2 | 2.76e−4 | 1.0443 | 0.0016 | −0.1074 |
| 3 | 2.8384e−4 | 1.0245 | 0.007 | −0.1724 |

For example, as to PMU data set 3, if $V_{err}$=1e−6, the line sensitivities from two methods are approximately 56, −70 while they are 38, −30 if $V_{err}$=1e−5, respectively. Based on Jump, the latter result approaches the target (42 only from Jump). Consequently, Jump gives a way to tune this threshold. The correct or reasonable setting should make line sensitivity estimation close to the Jump. Another way is by trail and error because a suitable setting makes the results stable and consistent no matter what data are used, e.g. any 10 seconds data. On the other hand, the tuning process can have results that are too sensitive to $V_{err}$.

The study of the PMU data often shows unstable results close to a Jump value. In several embodiments, weighted-average-slope ("WAS") may be used to address such an issue as follows:

$$\alpha(\beta) = \frac{\left(\sum_{i=1}^{n_1} X_{1i}\right)n_1 + \left(\sum_{i=1}^{n_2} X_{2i}\right)n_2 + \ldots + \left(\sum_{i=1}^{n_k} X_{ki}\right)n_k}{n_1 n_1 + n_2 n_2 + \ldots + n_k n_k}$$

s.t.

$X_k \in ((k-1)\overline{X}+a, k\overline{K}+a]$ for increasing slope α, $\overline{X}$ is the length of interval and a is offset or $X_k \in (-k\overline{Y}-b, -(k-1)\overline{Y}-b]$ for decreasing slope β, $\overline{Y}$ is the length of interval and b is offset In the foregoing example, the WAS should be about 1.01 to be close to the true value. Generally, a and b can be set to 0.

Similarly, a rough estimate of $\overline{X}$ can give satisfied results. One advantage of the foregoing technique is that the requirement on $V_{err}$ can be relaxed during analysis. Applying the foregoing technique to the PMU data set (PMU #3) produces the following result:

TABLE VI

| Setting | Sensitivity | 0-10 s | 20-30 s |
|---|---|---|---|
| $V_{err}$ = 1e−5 | α | 38.41 | 34.49 |
| Mean Value | β | −28.41 | −29.71 |
| $V_{err}$ = 1e−6 | α | 37.06 | 34.3628 |
| WAS, X = 300, Y = 100 | β | −29.14 | −39.48 |

D. Fast Bi-Direction Sensitivity Calculation

Each PMU data point provides bus voltage and angle, line current and angle, from which a line reactive power $Q_{ij}$ can be calculated. Using such information, FBSC can be applied to estimate the line sensitivity based on the following:

a. From PMU data, calculate line reactive power Q for each time stamp during a time period
b. Form the data set $\{(V_i^k, Q_{ij}^k)\}$
c. Filter the data set in terms of bad data and/or data without measurement
d. Calculate the slope for every two successive points in the data set
e. Applying data split, two subsets are created
f. Obtain weighted-average-slope for each subset corresponding to sensitivity The line reactive power can be expressed as:

$$Q_{ij} = -V_i^2(B_{ij}+B_{i0}) - V_i V_j(G_{ij}\sin\delta_{ij} - B_{ij}\cos\delta_{ij}) \quad (1)$$

Where $B_{ij}$ and $G_{ij}$ are the parameters of line. $B_{i0}$ is the susceptance in terminal i. And $\delta_{ij}=\delta_i-\delta_j$. As such, $Q_{ij}$ is the function of four variables: $V_i$, $V_j$, $\delta_i$ and $\delta_j$. Applying a first-order Taylor equation for the four variables yields:

$$\frac{\partial Q_{ij}}{\partial V_i} = -2V_i(B_{ij}+B_{i0}) - V_j(G_{ij}\sin\delta_{ij} - B_{ij}\cos\delta_{ij}) \quad (2)$$

$$\frac{\partial Q_{ij}}{\partial V_j} = -V_i(G_{ij}\sin\delta_{ij} - B_{ij}\cos\delta_{ij}) \quad (3)$$

$$\frac{\partial Q_{ij}}{\partial \delta_i} = -V_i V_j(G_{ij}\cos\delta_{ij} + B_{ij}\sin\delta_{ij}) \quad (4)$$

$$\frac{\partial Q_{ij}}{\partial \delta_j} = V_i V_j(G_{ij}\cos\delta_{ij} + B_{ij}\sin\delta_{ij}) \quad (5)$$

$$\Delta Q_{ij} = \frac{\partial Q_{ij}}{\partial V_i}\Delta V_i + \frac{\partial Q_{ij}}{\partial V_j}\Delta V_j + \frac{\partial Q_{ij}}{\partial \delta_i}\Delta\delta_i + \frac{\partial Q_{ij}}{\partial \delta_j}\Delta\delta_j \quad (6)$$

The term $$\frac{\partial Q_{ij}}{\partial \delta_i}\Delta\delta_i + \frac{\partial Q_{ij}}{\partial \delta_j}\Delta\delta_j$$

does not affect so much since $$\frac{\partial Q_{ij}}{\partial \delta_i} = -\frac{\partial Q_{ij}}{\partial \delta_j}.$$

Hence first-order partial equation can be expressed as:

$$\frac{\Delta Q_{ij}}{\Delta V_i} = \frac{\partial Q_{ij}}{\partial V_i} + \frac{\partial Q_{ij}}{\partial V_j}\frac{\Delta V_j}{\Delta V_i} \quad (7)$$

By (7), BLA directly obtains the slope between every two successive points. After data split and weighted-average-slope, the two sensitivities can be found.

In certain embodiments, the line parameters can be obtained by applying BLA as follows:

a. The PMU data from both terminals of one line are used. But if there is no PMU in the other terminal of the line, calculate $V_j$ and $\delta_j$ via PMU data in this terminal and line parameters.
b. Form the data set $\{(V_i^k, V_j^k)\}$.
c. Filter the data set in terms of bad data and no measurement.
d. Calculate partial derivatives by line parameters by (2) and (3).
e. By (7), calculate the slope for every two successive points in the data set.
f. By applying data split, two subsets are created.
g. Process each subset to at least partially remove bad data and noise.
h. Obtain weighted-average-slope for each subset corresponding to sensitivity.

The big change (Jump) can provide useful information. Comparing to fluctuation, Jump can be distinguished from data. Calculating line sensitivity ($\Delta Q_{ij}/\Delta V_i$) from such different data points, e.g. the points before and after an event, can reveal system characteristics around an operation point. Therefore such line sensitivity can be relatively accurate.

Normally, there is a "peak" occurring when the bus voltage changes a lot. It can be resulted from dynamic response of generators or some devices' dynamic features. On the other hand, by capturing the data in a time window before and after a Jump, line sensitivities can be calculated. The time window can include the "peak" time and the results from Jump is sort of mixture of dynamic and static behaviors of the system. If only consider the static response like power flow, no peak value occurs.

Figure 23:
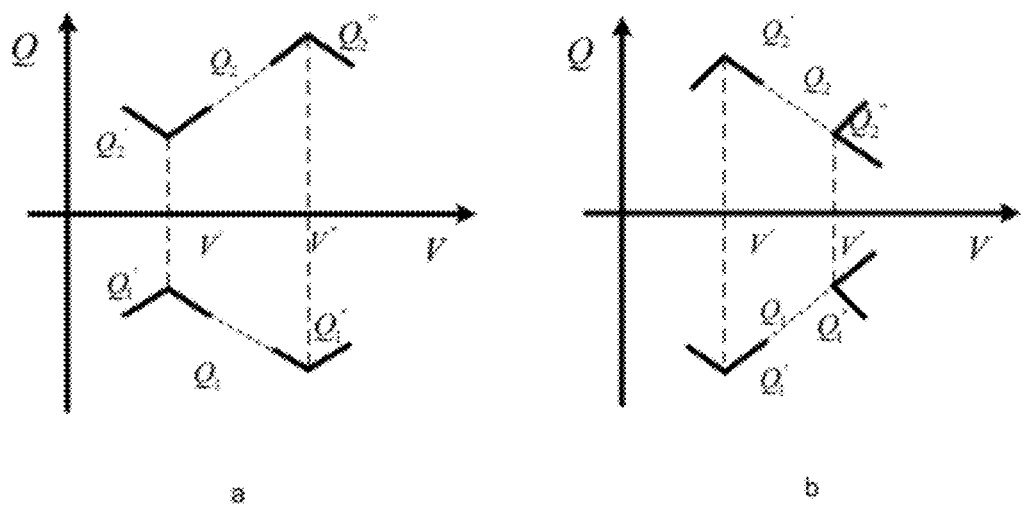
FIG. 23 illustrates a relationship between V-Q fluctuation and jump in a power system in accordance with embodiments of the technology.

Jump or static approximation may be used to tune the parameters. FIG. 23 shows one kind of ideal relationship between fluctuation and Jump. V' and V" are the bus voltage before and after Jump:

$$\alpha_{Jump} = \frac{Q_2'' - Q_2'}{V'' - V'} \left( \text{or } \frac{Q_1'' - Q_1'}{V'' - V'} \right) \quad (8)$$

$$\beta_{Jump} = \frac{Q_2'' - Q_2'}{V'' - V'} \left( \text{or } \frac{Q_1'' - Q_1'}{V'' - V'} \right) \quad (9)$$

Test and Simulation System

Figure 24:
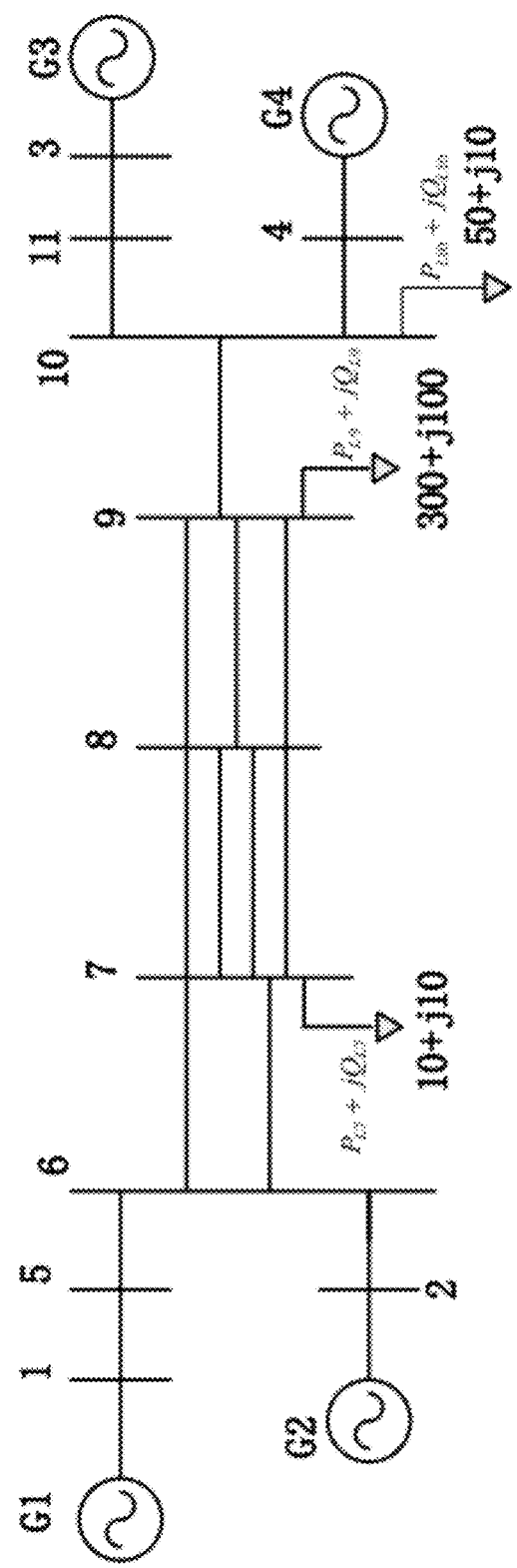
FIG. 24 is a schematic diagram illustrating an example power system used for testing in accordance with embodiments of the technology.

One example two-area system is shown in FIG. 24. Some noise resources were introduced in the system of FIG. 24 to simulate the load fluctuations and noise. Several experiments were conducted as shown in Table III below.

TABLE III

| | | $V_i$ | | $Q_{ij}$ | |
|---|---|---|---|---|---|
| | | σ | μ | σ | μ |
| | One Noise Source with σ = 1 and μ = 0 at bus 7 | | | | |
| 1 | | 1.0182e-4 | 1.0061 | 0.0024 | -0.2876 |
| | Two Noise Sources with σ = 1 and μ = 0 at bus 7 and bus 9 | | | | |
| 2 | | 4.1164e-4 | 1.0061 | 0.011 | -0.2876 |
| | Three Noise Sources with σ = 1 and μ = 0 at bus 7, bus 9 and bus 8 | | | | |
| 3 | | 4.2676e-4 | 1.0061 | 0.011 | -0.2880 |
| | Three Noise Sources with σ = 0.1 and μ = 0 at bus 7, bus 9 and bus 8 | | | | |
| 4 | | 4.1827e-5 | 1.0061 | 0.0011 | -0.2878 |

Several parameters were tuned initially. For instance, $V_{err}$=1e-7 for scenario 1, $V_{err}$=1e-4(1e-5) for scenario 2 or 3, and $V_{err}$=1e-5(1e-6) for scenario 4. Hence, in the viewpoint of either statistic estimation or threshold setting, scenario 2 and 3 can be candidates. Three noise sources with σ=1 and μ=0 at bus 7, bus 9 and bus 8 were chosen.

In one test, the number of the generators is reduced, i.e., fewer generators were used to support the same load with the same topology. In summary, test systems used were:

A. The two-area system with full 4 generators (G1, G2, G3 and G4). Three noise sources with σ=1 and μ=0 at bus 7, bus 9 and bus 8.
B. The two-area system with three 3 generators (G1, G2 and G3). Three noise sources with σ=1 and μi=0 at bus 7, bus 9 and bus 8.
C. The two-area system with only 2 generators (G1 and G2). Three noise sources with σ=1 and μi=0 at bus 7, bus 9 and bus 8.

Table IV below shows the statistic estimation for the test systems. Although there are obviously differences, $V_{err}$ can be set to be same value 1e-6 if we apply weighted-average-slope which relaxes the requirement on the threshold. For all three test systems, $\overline{X}$ is 100 and $\overline{Y}$ is 50 on line 9-10 while they are 10 and 50 on line 9-8 respectively.

TABLE IV

| | $V_i$ | | $Q_{ij}$ | |
|---|---|---|---|---|
| System | σ | μ | σ | μ |
| A | 4.2676e-4 | 1.0061 | 0.011 | -0.2880 |
| B | 7.2635e-4 | 0.9927 | 0.0079 | -0.4707 |
| C | 0.0015 | 0.8089 | 1.6048e-4 | 0.0639 |

The estimations are shown in Table V below. The results from FBSC and BLA come from 10 seconds data. Jump happens because of the inserting a 30 MVar shunt capacitor at bus 9 at 10 seconds.

TABLE V

Line sensitivity estimations and the indices

| | A | | | | | B | | | | | C | | | | |
|---|---|---|---|---|---|---|---|---|---|---|---|---|---|---|---|
| Test | 9-10 | | 9-8 | | | 9-10 | | 9-8 | | | 9-10 | | 9-8 | | |
| Systems | α | β | α | β | Γ | α | β | α | β | Γ | α | β | α | β | Γ |
| FBSC | 24 | −17 | 3.5 | −7 | 34.5 | 10 | −16 | 3.4 | −5 | 20.2 | 0.5 | −0.11 | 2.1 | −2.5 | 6.8 |
| BLA | 26 | −18 | 3.8 | −8.2 | 37.4 | 11 | −17 | 3 | −6.2 | 20 | −0.11 | −0.3 | 2.7 | −3.4 | 6.9 |
| Jump | 38 | −10 | 3 | −11 | 42 | 16 | −11 | 3.2 | −6 | 25.6 | −0.11 | −10 | 2.8 | −1 | 8.3 |

To effect a negative Jump, two 30 Mvar shunt capacitors were inserted at bus 8 and 10 respectively at different times. For the positive line sensitivity α, the results are satisfied since both FBSC and BLA demonstrate generally consistent characteristics. The voltage security assessment index Γ succeeds in discovering the system status. Consequently, System A has the highest voltage security level while System C is near collapse. In the following discussion, some contingencies were added.

A. Increase Reactive Load in Load Bus

Figure 25:
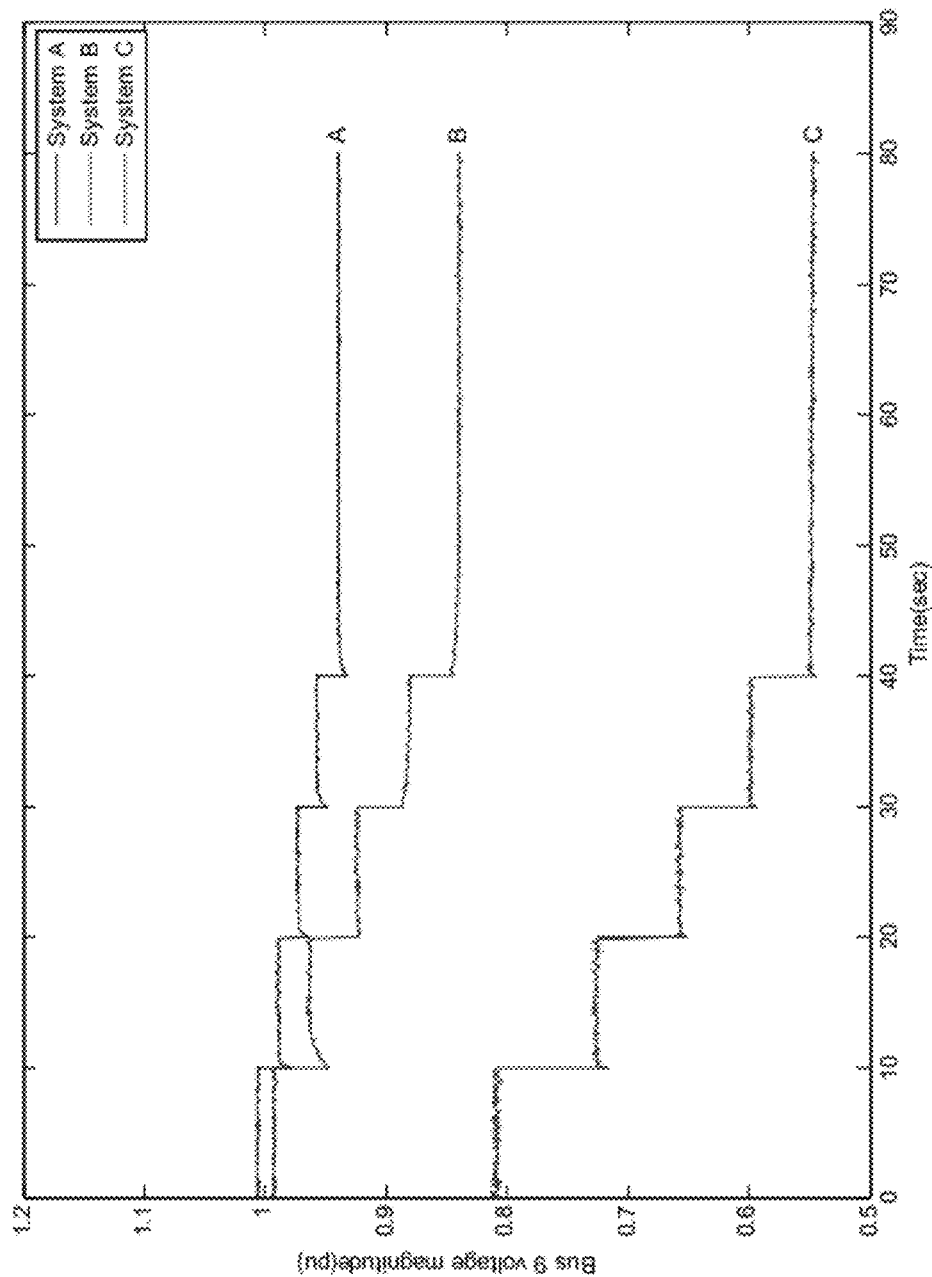
FIG. 25 illustrates a bus voltage response for a load increase in the example power system of FIG. 24 in accordance with embodiments of the technology._

It was desirable to study the reactive power margin in the major load bus (bus 9) since the reactive power margin is also an important parameter during analysis of voltage security. 100 MVar was added every 10 seconds at bus 9 in all three test systems (total 500 Mvar). FIG. 25 shows the voltage response of bus 9 in all three test systems. As shown in FIG. 25, System C would collapse only after a total 400 MVar reactive load addition.

B. Double Lines Between 9-8 Tripped Out

Figure 26:
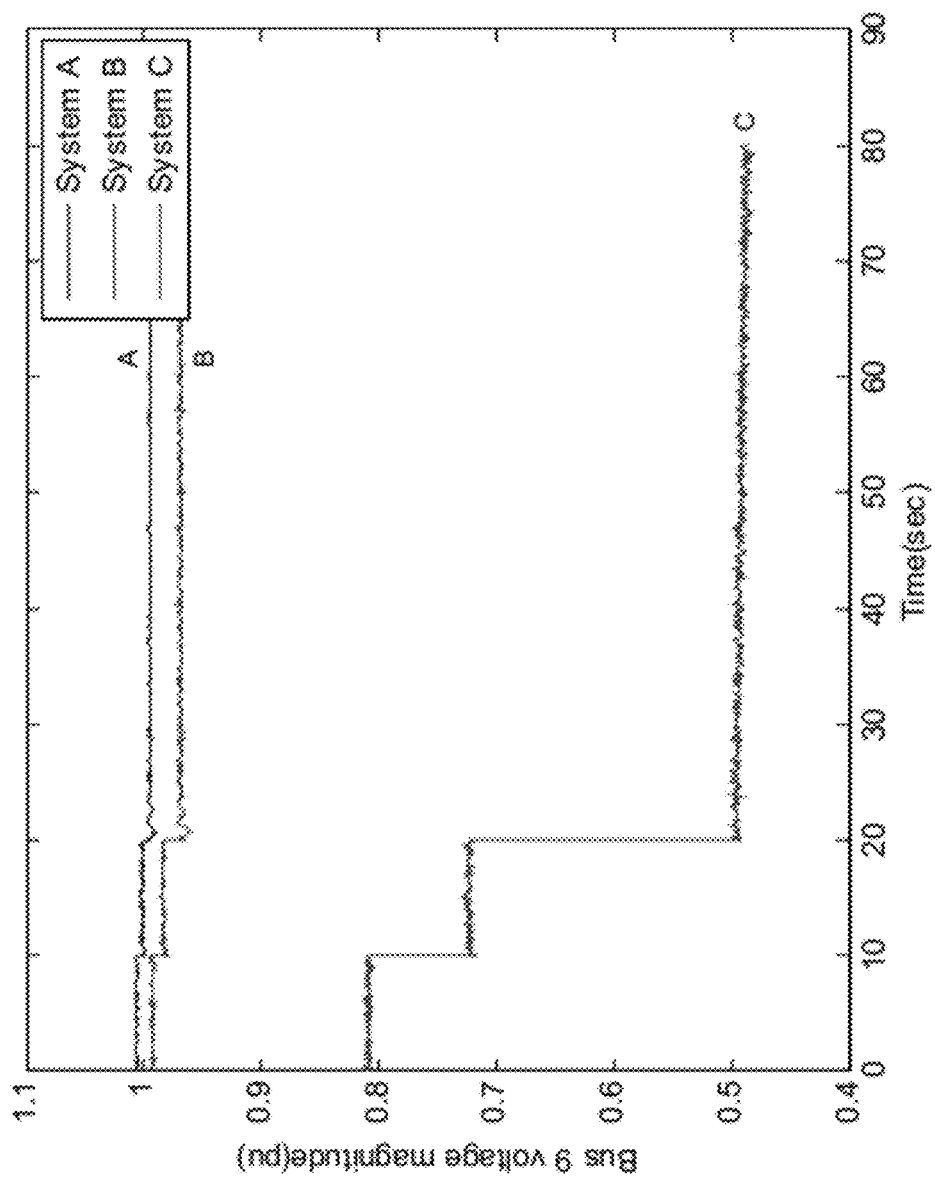
FIG. 26 illustrates a bus voltage response for a double-line trip in the example power system of FIG. 24 in accordance with embodiments of the technology.

There are three parallel lines between bus 9 and bus 8, which are tie lines. If some of them trip out, the system has to change to a new operation situation. The events happen at 10 seconds and 20 seconds. Since System A and B are strong enough, this contingency does not affect these two system but only making them weaker. But, System C would collapse as shown in FIG. 26.

PMU data from the Eastern System or Western System in United States were used for testing. FBSC and BLA were tested for each set of PMU data so that the results from both techniques were compared. Also, if there is a PMU in the other terminal of the line, sensitivities can also be obtained by calculating line reactive flow in the other terminal and using the bus voltage instead of those from impedance.

Any long data set may be used to calculate line sensitivity, but in the following examples, 1-second and 10-seconds data were chosen in order to show the effects of different length of time window. For all cases, $V_{err}$=1e−6. After tuning, (50,50) are set on both Test A and Test B and (300,100) is with Test C.

A. Test on PMU #1

Figure 27:
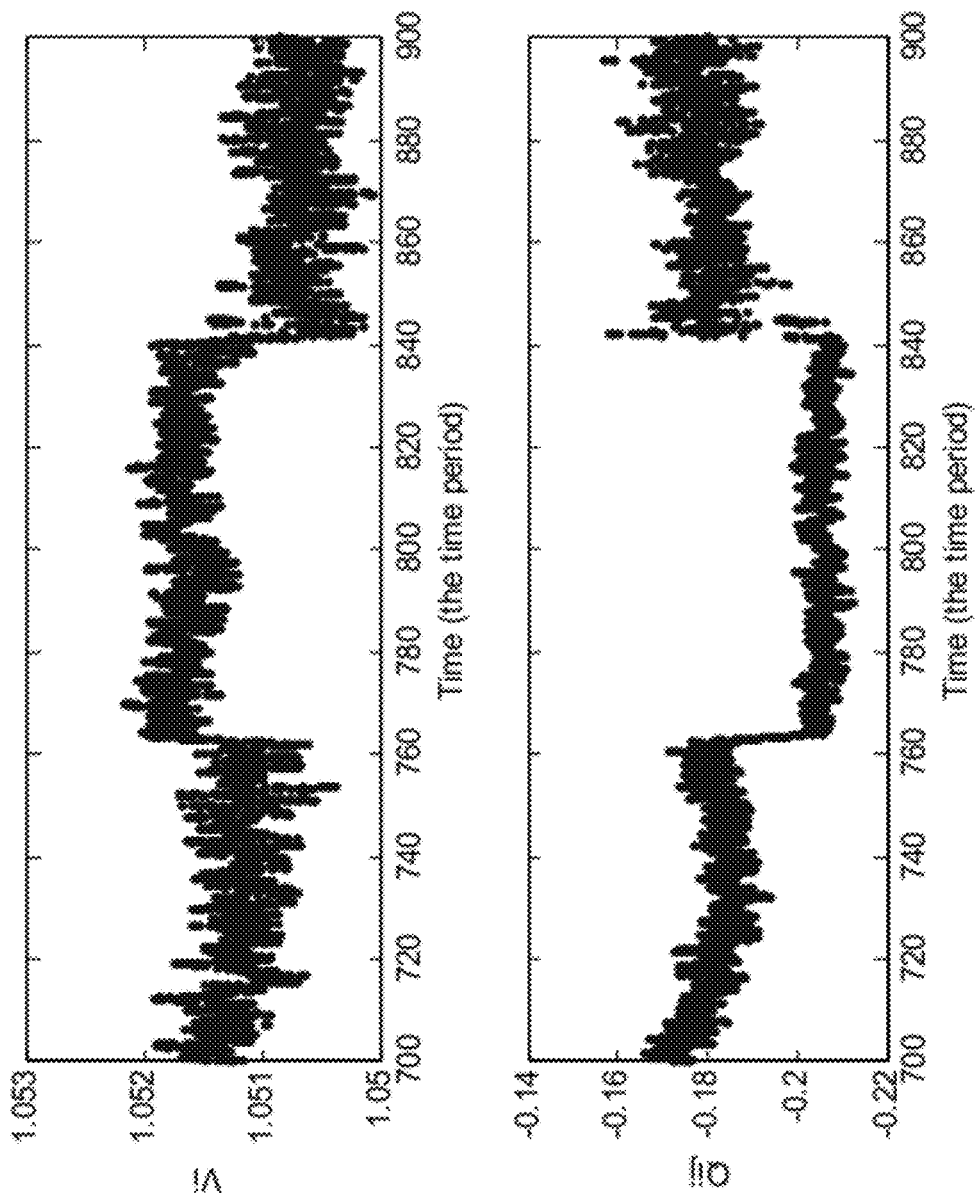
FIG. 27 illustrates V and Q with respect to time in accordance with embodiments of the technology.
Figure 28:
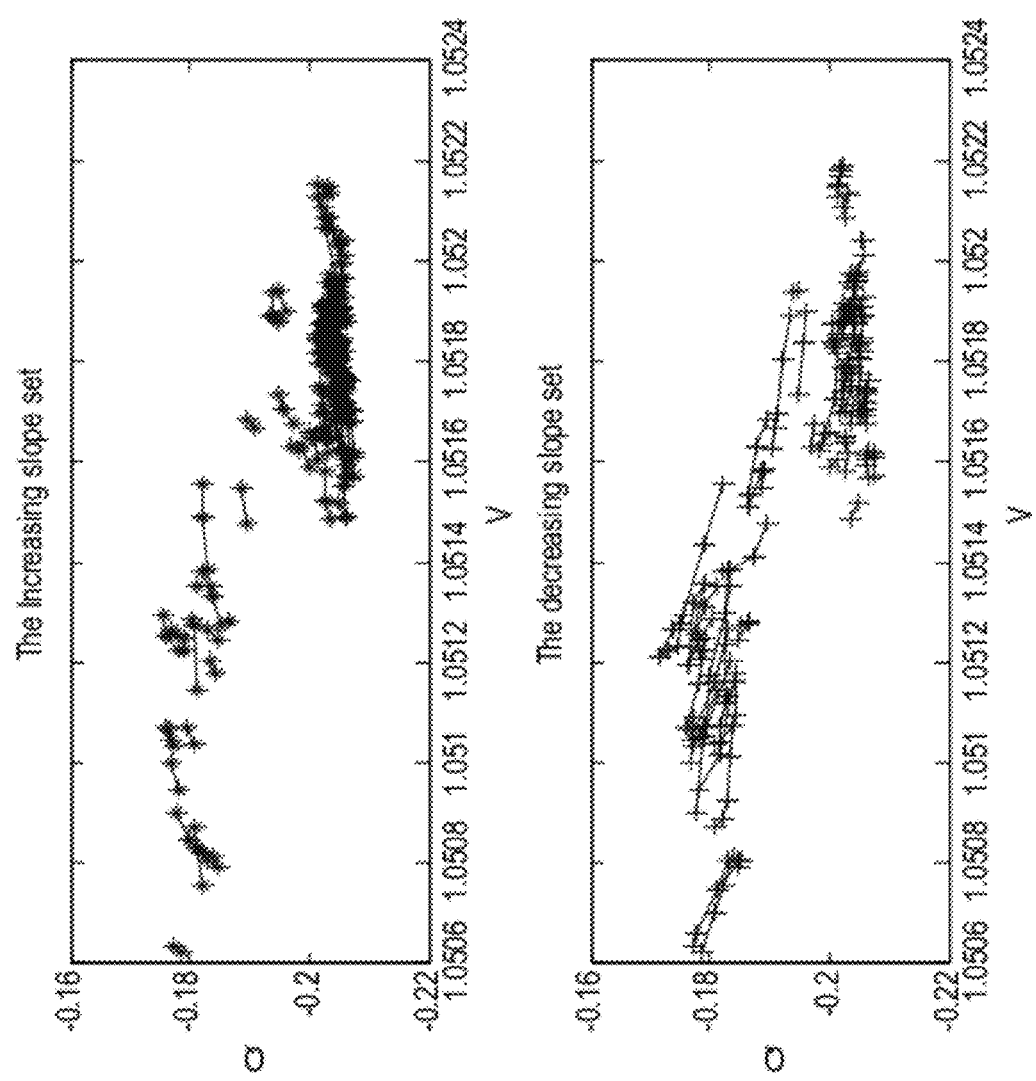
FIGS. 28-33 illustrate V-Q pairs with increasing and decreasing slopes in accordance with embodiments of the technology.

An only-way test was conducted in which FBSC was used. FIG. 27 is the snapshot of the 200-seconds data. There are two Jumps occurring around 760 seconds and 840 seconds. FIG. 28 is about two subsets around 760 seconds after data split. Table VI shows the results from FBSC and Jump.

TABLE VI

| Sensitivity | 700 s-701 s | 700 s-710 s | 800 s-801 s | 800 s-810 s | 860 s-861 s | 860 s-870 s |
|---|---|---|---|---|---|---|
| α | 22.73 | 19.61 | 16.50 | 17.45 | 17.15 | 21.82 |
| β | −28.49 | −21.88 | −13.01 | −15.63 | −24.52 | −22.82 |
| $β_{Jump}$ | | −24.4831 around 760 s and −26.2965 around 840 s | | | | |

B. Test on PMU #2

Figure 29:
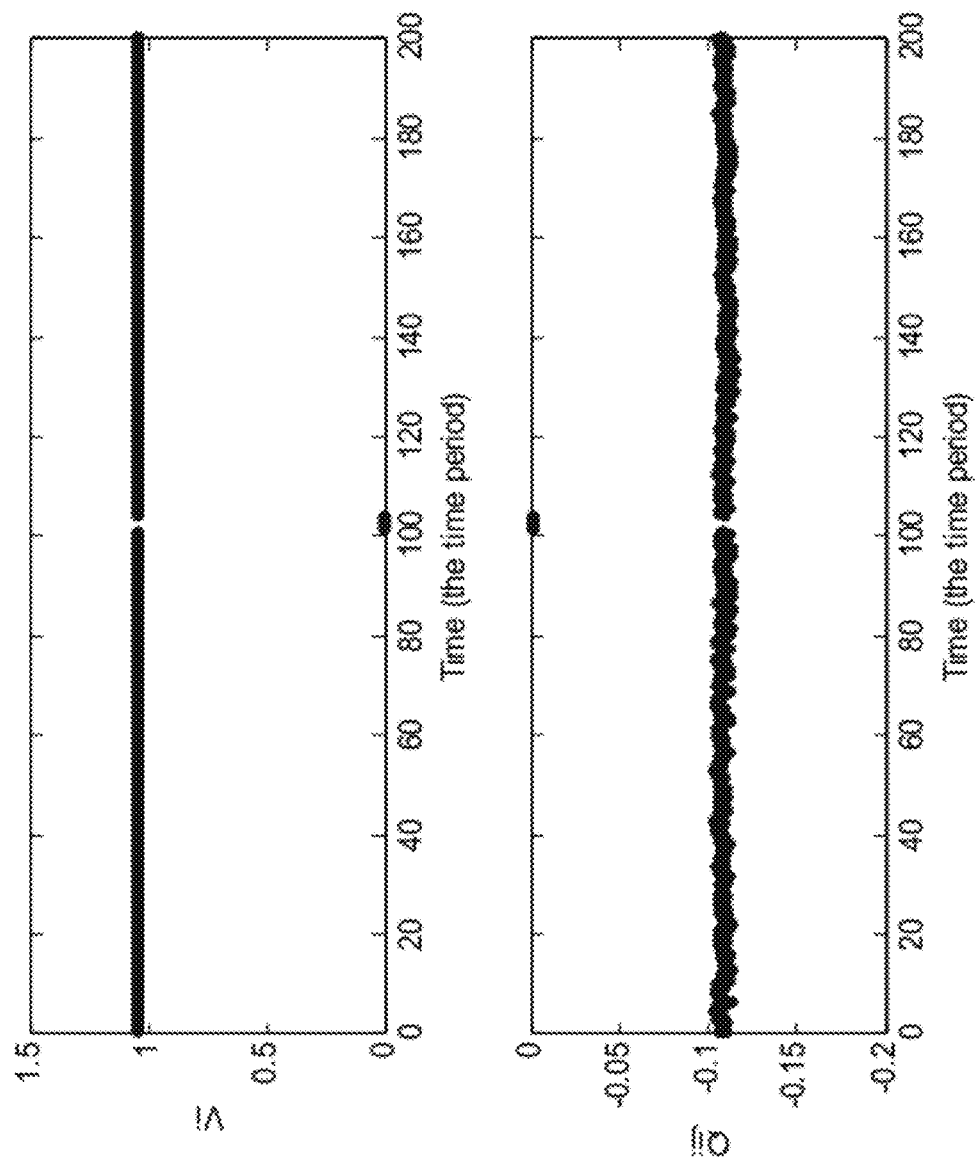
Figure 30:
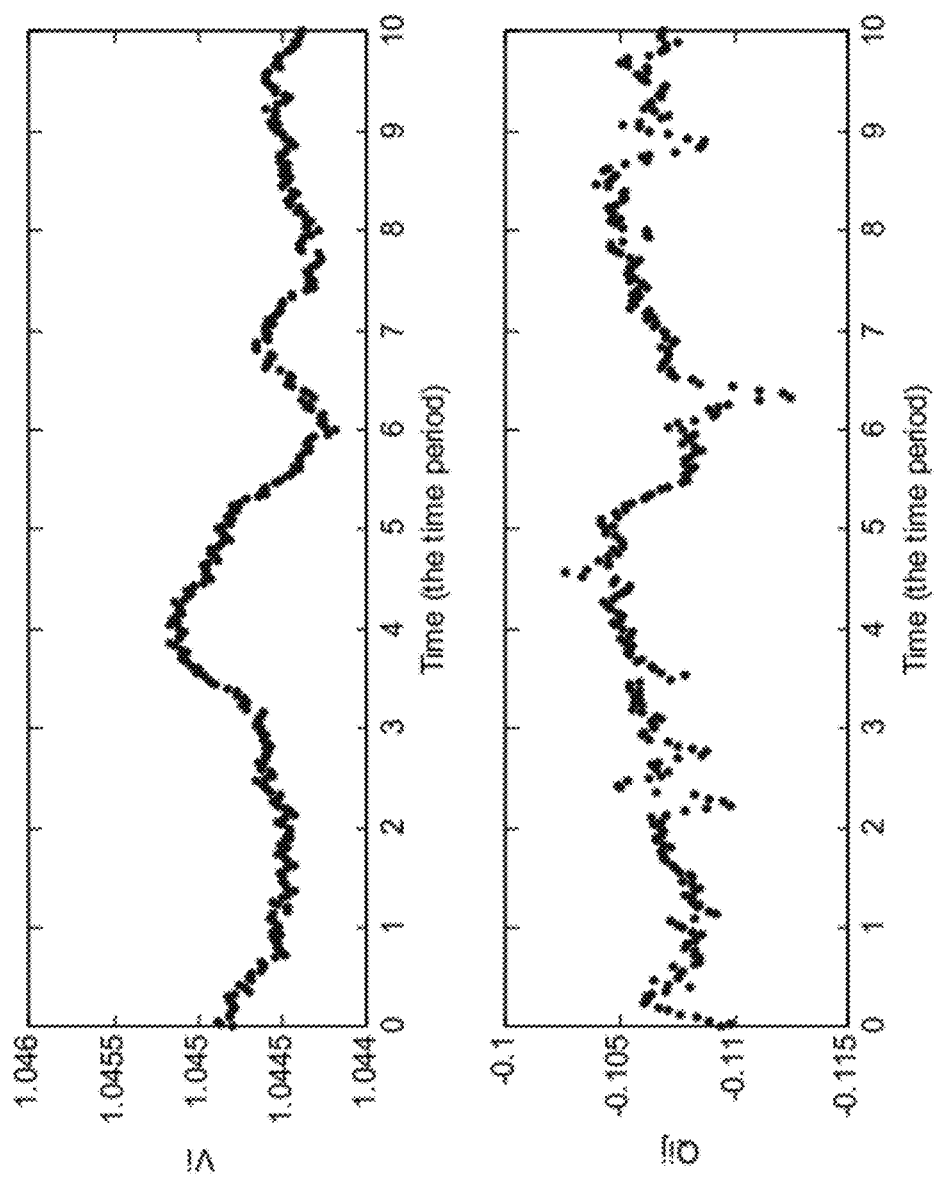
Figure 31:
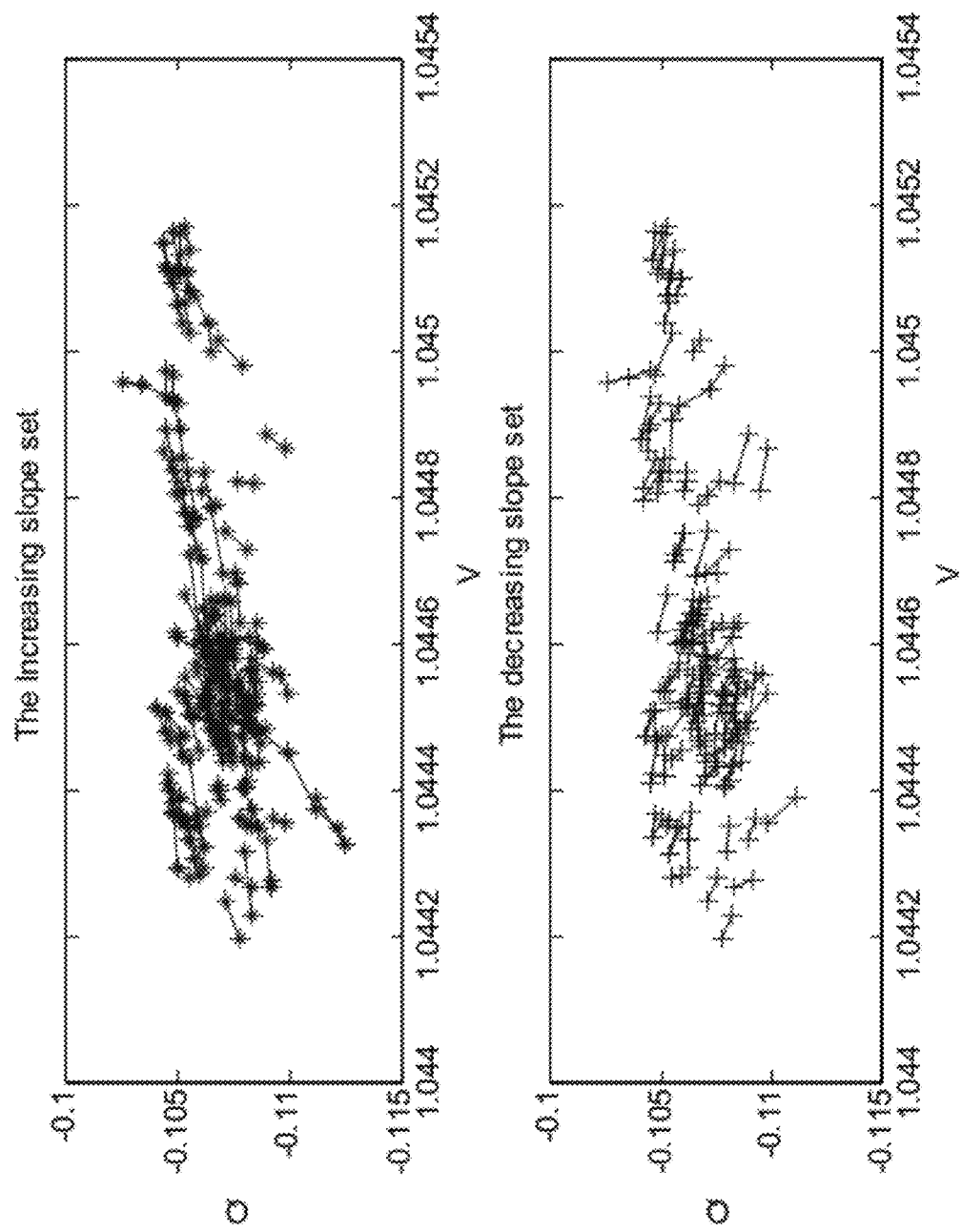

The PMU data were captured when the system experienced some test events, e.g., the system is injected some noise. The magnitude could be ±5 MW or ±10 MW at different node. Since the network parameters for this system are present, both FBSC and BLA can be used. The snapshot of the first 200-seconds data is shown in FIG. 29. The first 10-seconds data and its subsets are shown in FIGS. 30 and 31. And the line sensitivities are shown in Table VII and Table VIII below. The results from both methods are still comparable and are robust with respect to noise.

TABLE VII

SENSITIVITIES FROM FBSC IN TEST B

| Sensitivity | 0 s-1 s | 0 s-10 s | 50 s-51 s | 50 s-60 s | 150 s-151 s | 150 s-160 s |
|---|---|---|---|---|---|---|
| α | 16.64 | 14.77 | 10.13 | 15.21 | 17.87 | 15.79 |
| β | −18.73 | −14.81 | −12.85 | −15.43 | −16.57 | −13.25 |

TABLE VIII

SENSITIVITIES FROM BLA IN TEST B

| Sensitivity | 0 s-1 s | 0 s-10 s | 50 s-51 s | 50 s-60 s | 150 s-151 s | 150 s-160 s |
|---|---|---|---|---|---|---|
| α | 21.76 | 15.86 | 10.97 | 16.54 | 20.78 | 17.32 |
| β | −20.97 | −15.51 | −14.26 | −18.43 | −22.32 | −15.60 |

C. Test on PMU #3

Figure 32:
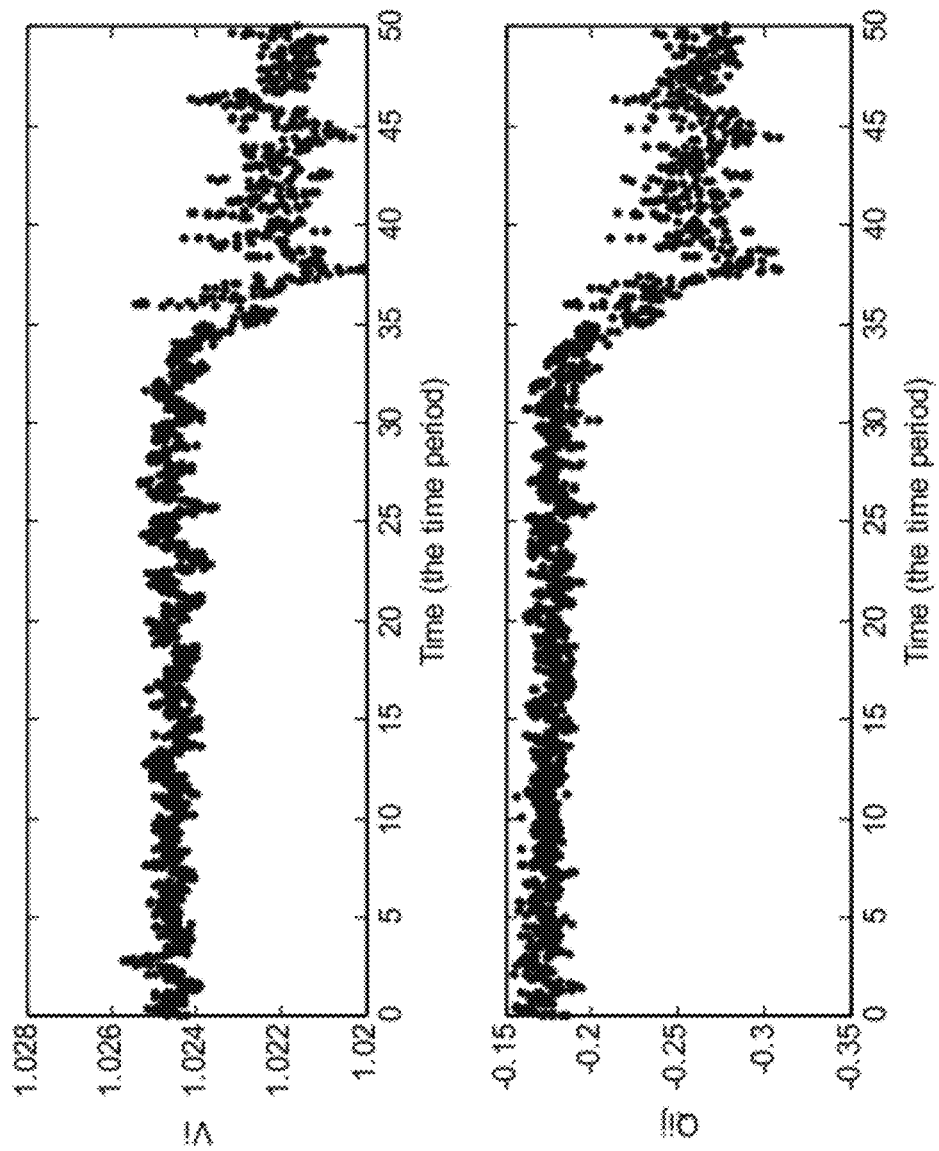
Figure 33:
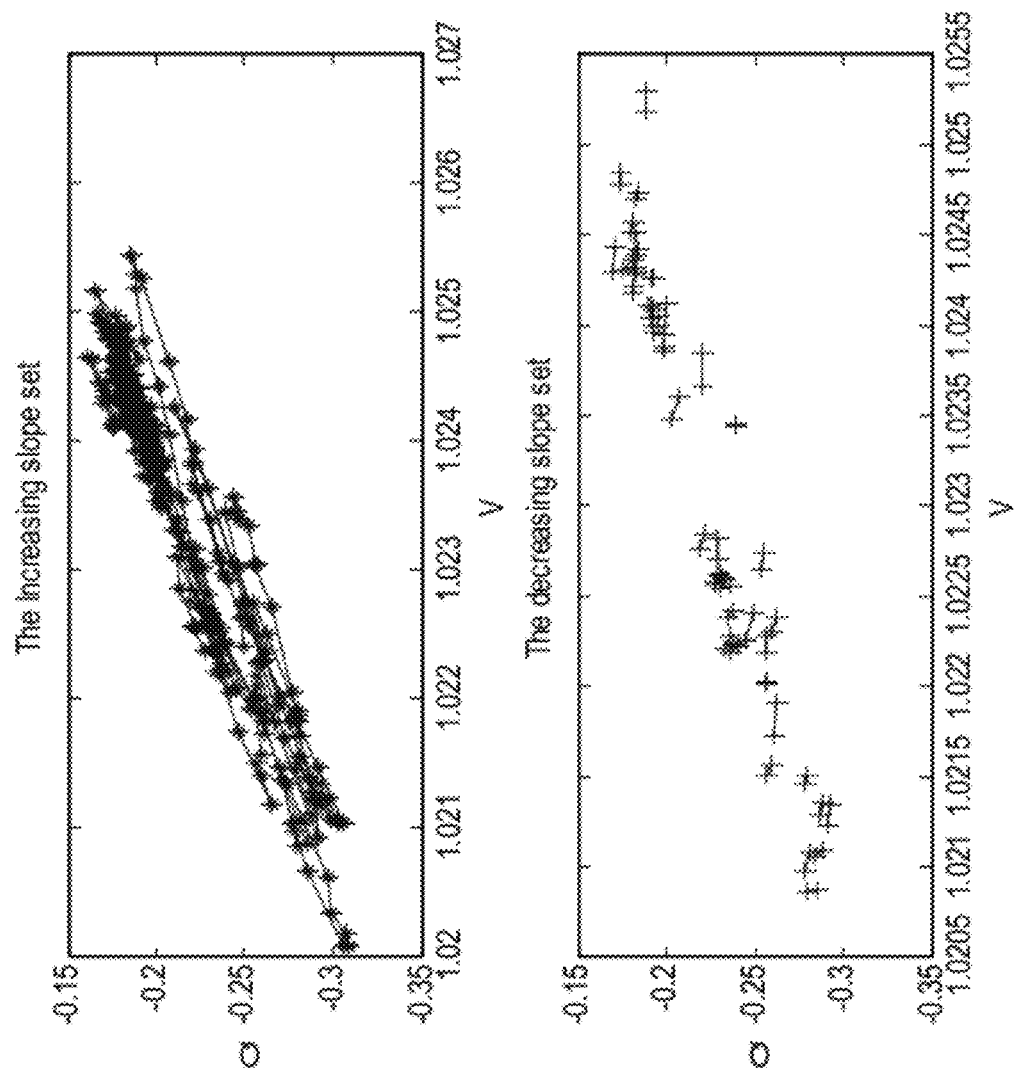

A Jump existed around 35 seconds as shown in FIG. 32. FIG. 33 is the subsets between 30 s-40 s. The estimated line sensitivities from either FBSC or BLA in Table IX and X are satisfactory.

TABLE IX

SENSITIVITIES FROM FBSC IN TEST C

| Sensitivity | 0 s-1 s | 0 s-10 s | 30 s-31 s | 30 s-40 s | 40 s-41 s | 40 s-50 s |
|---|---|---|---|---|---|---|
| α | 38.66 | 38.41 | 49.51 | 41.29 | 28.91 | 36.11 |
| β | −22.42 | −28.40 | −42.01 | −30.36 | −27.88 | −40.67 |
| $\alpha_{Jump}$ | | | 42.33 around 35 s | | | |

TABLE X

SENSITIVITIES FROM BLA IN TEST C

| Sensitivity | 0 s-1 s | 0 s-10 s | 30 s-31 s | 30 s-40 s | 40 s-41 s | 40 s-50 s |
|---|---|---|---|---|---|---|
| α | 39.50 | 38.54 | 47.46 | 38.60 | 27.73 | 34.77 |
| β | −18.04 | −22.07 | −41.10 | −29.23 | −23.77 | −41.23 |

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the disclosure is not limited except as by the appended claims.

We claim:

1. A method for assessing voltage security in a power system having a number (i) of buses, comprising:
   capturing a change in bus voltage and a change in line reactive power for at least some of the buses in the power system;
   for at least one of the i number of buses, calculating a voltage assessment index (Γ) for as follows:

$$\Gamma_i = \sum_j \frac{\Delta Q_{ij}}{\Delta V_i}$$

where $\Delta V_i$ is the change in bus voltage and $\Delta Q_{ij}$ is the change in line reactive power from a connection j over a predetermined period of time; and
   assessing a current voltage security status of the at least one of the i number of buses and/or the power system based on the calculated voltage assessment index ($\Gamma_i$).

2. The method of claim 1 wherein capturing a change in bus voltage and a change in line reactive power includes inserting a shunt device.

3. The method of claim 1 wherein capturing a change in bus voltage and a change in line reactive power includes analyzing data collected by a phasor measurement unit coupled to the bus.

4. The method of claim 1 wherein capturing a change in bus voltage and a change in line reactive power includes applying fast bi-direction sensitivity calculation and/or best linear approximation to data collected by a phasor measurement unit coupled to one of the buses.

5. The method of claim 1 wherein capturing a change in bus voltage and a change in line reactive power includes applying fast bi-direction sensitivity calculation to data collected by a phasor measurement unit coupled to one of the buses as follows:
   from the data, calculating line reactive power for individual time stamps;
   forming a data set $\{(V_i^k, Q_{ij}^k)\}$ where $V_i^k$ is a voltage of bus i at time k and $Q_{ij}^k$ s the line reactive power of bus i at time k from connection j;
   calculating a slope for every two successive points in the data set $\{(V_i^k, Q_{ij}^k)\}$;
   creating first and second subsets of data by applying data split, the first subset having positive slopes and the second subset having negative slopes; and
   obtaining weighted average slope for each of the first and second subsets.

6. The method of claim 1 wherein capturing a change in bus voltage and a change in line reactive power includes applying best linear approximation to data collected by a phasor measurement unit coupled to one of the buses as follows:
   obtaining data collected by the phasor measurement unit at both terminals of the bus;
   forming a data set $\{(V_i^k, Q_{ij}^k)\}$ where $V_i^k$ is a voltage of bus i at time k and $Q_{ij}^k$ is the line reactive power of bus i at time k from connection j;
   calculating a slope for every two successive points in the data set $\{(V_i^k, Q_{ij}^k)\}$;
   creating first and second subsets of data by applying data split, the first subset having positive slopes and the second subset having negative slopes; and
   obtaining weighted average slope for each of the first and second subsets.

7. The method of claim 1 wherein assessing a current voltage security status includes determining whether the calculated voltage assessment index ($\Gamma_i$) is within a threshold from zero.

8. The method of claim 1 wherein assessing a current voltage security status includes determining whether the calculated voltage assessment index ($\Gamma_i$) is within a threshold from zero, and if yes, indicating a potential system failure.

9. A power system, comprising:
   a power source;
   a power consuming load;
   a power grid operatively coupling the power source to the power consuming load;
   a plurality of phasor measurement units operatively coupled to the power source, the power consuming load, and/or the power grid, the phasor measurement units being configured to collect a plurality of phasor measurements from the power source, the power consuming load, and/or the power grid; and
   a processor operatively coupled to the plurality of phasor measurement units, the processor having a non-transitory computer readable medium containing codes for performing a method comprising:
   capturing a change in bus voltage and a change in line reactive power for at least one of the buses in the power system;
   for each of the i number of buses, calculating a voltage assessment index ($\Gamma_i$) for as follows:

$$\Gamma_i = \sum_j \frac{\Delta Q_{ij}}{\Delta V_i}$$

where $\Delta V_i$ is the change in bus voltage and $\Delta Q_{ij}$ is the change in line reactive power from a connection j over a predetermined period of time; and
   assessing a current voltage security status of the at least one of the i number of buses and/or the power system based on the calculated voltage assessment index ($\Gamma_i$).

10. The power system of claim 9 wherein capturing a change in bus voltage and a change in line reactive power includes inserting a shunt device.

11. The power system of claim 9 wherein capturing a change in bus voltage and a change in line reactive power includes analyzing data collected by a phasor measurement unit coupled to the bus.

12. The power system of claim 9 wherein capturing a change in bus voltage and a change in line reactive power includes applying fast bi-direction sensitivity calculation and/or best linear approximation to data collected by a phasor measurement unit coupled to one of the buses.

13. The power system of claim 9 wherein capturing a change in bus voltage and a change in line reactive power includes applying fast bi-direction sensitivity calculation to data collected by a phasor measurement unit coupled to one of the buses as follows:
- from the data, calculating line reactive power for individual time stamps;
- forming a data set $\{(V_i^k, Q_{ij}^k)\}$ where $V_i^k$ is a voltage of bus i at time k and $Q_{ij}^k$ is the line reactive power of bus i at time k from connection j;
- calculating a slope for every two successive points in the data set $\{(V_i^k, Q_{ij}^k)\}$;
- creating first and second subsets of data by applying data split, the first subset having positive slopes and the second subset having negative slopes; and
- obtaining weighted average slope for each of the first and second subsets.

14. The power system of claim 9 wherein capturing a change in bus voltage and a change in line reactive power includes applying best linear approximation to data collected by a phasor measurement unit coupled to one of the buses as follows:
- obtaining data collected by the phasor measurement unit at both terminals of the bus;
- forming a data set $\{(V_i^k, Q_{ij}^k)\}$ where $V_i^k$ is a voltage of bus i at time k and $Q_{ij}^k$ is the line reactive power of bus i at time k from connection j;
- calculating a slope for every two successive points in the data set $\{(V_i^k, Q_z\%)\}$;
- creating first and second subsets of data by applying data split, the first subset having positive slopes and the second subset having negative slopes; and
- obtaining weighted average slope for each of the first and second subsets.

15. The power system of claim 9 wherein assessing a current voltage security status includes determining whether the calculated voltage assessment index ($\Gamma_i$) is within a threshold from zero.

16. The power system of claim 9 wherein assessing a current voltage security status includes determining whether the calculated voltage assessment index ($\Gamma_i$) is within a threshold from zero, and if yes, indicating a potential system failure.

17. A computer system for assessing voltage security in a power system, comprising:
- a processor; and
- a non-transitory computer readable medium operatively coupled to the processor, the non-transitory computer readable medium containing codes for performing a method comprising:
  - capturing a change in bus voltage and a change in line reactive power for at least some of the buses in the power system;
  - for at least one of the i number of buses, calculating a voltage assessment index ($\Gamma_i$) for as follows:

$$\Gamma_i = \sum_j \frac{\Delta Q_{ij}}{\Delta V_i}$$

where $\Delta V_i$ is the change in bus voltage and $\Delta Q_{ij}$ is the change in line reactive power from a connection j over a predetermined period of time; and
  - assessing a current voltage security status of the at least one of the i number of buses and/or the power system based on the calculated voltage assessment index ($\Gamma_i$).

18. The computer system of claim 17 wherein capturing a change in bus voltage and a change in line reactive power includes applying fast bi-direction sensitivity calculation to data collected by a phasor measurement unit coupled to one of the buses as follows:
- from the data, calculating line reactive power for individual time stamps;
- forming a data set $\{(V_i^k, Q_{ij}^k)\}$ where $V_i^k$ is a voltage of bus i at time k and $Q_{ij}^k$ is the line reactive power of bus i at time k from connection j;
- calculating a slope for every two successive points in the data set $\{(V_i^k, Q_{ij}^k)\}$;
- creating first and second subsets of data by applying data split, the first subset having positive slopes and the second subset having negative slopes; and
- obtaining weighted average slope for each of the first and second subsets.

19. The computer system of claim 17 wherein capturing a change in bus voltage and a change in line reactive power includes applying best linear approximation to data collected by a phasor measurement unit coupled to one of the buses as follows:
- obtaining data collected by the phasor measurement unit at both terminals of the bus;
- forming a data set $\{(V_i^k, Q_{ij}^k)\}$ where $V_i^k$ is a voltage of bus i at time k and $Q_{ij}^k$ is the line reactive power of bus i at time k from connection j;
- calculating a slope for every two successive points in the data set $\{(V_i^k, Q_{ij}^k)\}$;
- creating first and second subsets of data by applying data split, the first subset having positive slopes and the second subset having negative slopes; and
- obtaining weighted average slope for each of the first and second subsets.

20. The computer system of claim 17 wherein assessing a current voltage security status includes determining whether the calculated voltage assessment index ($\Gamma_i$) is within a threshold from zero.

* * * * *